(12) United States Patent
Sakhnini et al.

(10) Patent No.: US 12,301,486 B2
(45) Date of Patent: May 13, 2025

(54) MULTI-TRP SRS RESOURCE SET

(71) Applicant: QUALCOMM Incorporated, San Diego, CA (US)

(72) Inventors: Iyab Issam Sakhnini, San Diego, CA (US); Tao Luo, San Diego, CA (US); Yan Zhou, San Diego, CA (US); Juan Montojo, San Diego, CA (US); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1 day.

(21) Appl. No.: 17/373,583

(22) Filed: Jul. 12, 2021

(65) Prior Publication Data

US 2022/0014328 A1 Jan. 13, 2022

Related U.S. Application Data

(60) Provisional application No. 63/051,348, filed on Jul. 13, 2020.

(51) Int. Cl.
*H04L 5/00* (2006.01)
*H04W 56/00* (2009.01)

(52) U.S. Cl.
CPC ....... *H04L 5/0048* (2013.01); *H04W 56/0045* (2013.01)

(58) Field of Classification Search
CPC ..... H04L 5/0048; H04L 5/0035; H04L 5/005; H04L 5/0023; H04W 56/0045
See application file for complete search history.

(56) References Cited

U.S. PATENT DOCUMENTS

2017/0325225 A1 11/2017 Dinan
2019/0174466 A1 6/2019 Zhang et al.
(Continued)

FOREIGN PATENT DOCUMENTS

WO 2018203728 A1 11/2018
WO 2020102481 A1 5/2020

OTHER PUBLICATIONS

Ericsson: "New SID on Support of Reduced Capability NR Devices", 3GPP TSG RAN Meeting #86, 3GPP Draft, RP-193238, 3rd Generation Partnership Project (3GPP), Mobile Competence Centre, 650, Route Des Lucioles, F-06921 Sophia-Antipolis Cedex, France, vol. TSG RAN, No. Sitges, Spain, Dec. 9, 2019-Dec. 12, 2019, Dec. 12, 2019 (Dec. 12, 2019), 5 Pages, XP051840369, Retrieved from the Internet: URL: https://ftp.3gpp.org/tsg_ran/TSG_RAN/TSGR_86/Docs/RP-193238.zip RP-193238 New SID on support of reduced capability NR devices.doc [retrieved on Dec. 12, 2019] the whole document.

(Continued)

*Primary Examiner* — Justin T Van Roie
(74) *Attorney, Agent, or Firm* — Loza & Loza, LLP/QUALCOMM Incorporated

(57) ABSTRACT

Aspects relate to configuration of a single sounding reference signal (SRS) resource set for a UE that includes SRS resources associated with multiple, different transmission and reception points (TRPs). A radio access network (RAN) entity, which may be associated with one or more of the TRPs, may configure an SRS configuration for the SRS resource set and transmit the SRS configuration to the UE. The UE may then transmit a plurality of SRS(s) to the multiple TRPs in accordance with the SRS configuration. Other aspects, features, and examples are also claimed and described.

35 Claims, 17 Drawing Sheets

(56) References Cited

U.S. PATENT DOCUMENTS

| | | | |
|---|---|---|---|
| 2019/0190747 A1* | 6/2019 | Park | H04W 72/0473 |
| 2020/0044712 A1 | 2/2020 | Manolakos et al. | |
| 2020/0053752 A1 | 2/2020 | Huang et al. | |
| 2020/0077320 A1* | 3/2020 | Shimoda | H04L 5/001 |
| 2020/0106645 A1 | 4/2020 | Tsai et al. | |
| 2020/0162289 A1 | 5/2020 | Ahn et al. | |
| 2020/0221405 A1* | 7/2020 | Zarifi | H04W 52/50 |
| 2020/0382250 A1* | 12/2020 | Choi | H04L 5/0048 |
| 2023/0147639 A1* | 5/2023 | Go | H04B 7/0617 |
| | | | 455/101 |

OTHER PUBLICATIONS

International Search Report and Written Opinion—PCT/US2021/041462—ISA/EPO—Nov. 3, 2021.

* cited by examiner

MULTI-TRP SRS RESOURCE SET

CROSS-REFERENCE TO RELATED APPLICATIONS

The present Application for Patent claims priority to and the benefit of U.S. Provisional Application No. 63/051,348, filed Jul. 13, 2020, and assigned to the assignee hereof and hereby expressly incorporated by reference herein as if fully set forth below in its entirety and for all applicable purposes.

INTRODUCTION

The technology discussed below relates generally to wireless communication networks, and more particularly, to configuration of sounding reference signal (SRS) resources in beam-based communication scenarios.

In wireless communication systems, such as those specified under standards for 5G New Radio (NR), a base station and user equipment (UE) may utilize beamforming to compensate for high path loss and short range. Beamforming is a signal processing technique used with an antenna array for directional signal transmission and/or reception. Each antenna in the antenna array transmits a signal that is combined with other signals of other antennas of the same array in such a way that signals at particular angles experience constructive interference while others experience destructive interference.

The base station and the UE can select one or more beam pair links (BPLs) for communication therebetween on the downlink and/or the uplink. Each BPL includes corresponding transmit and receive beams on the base station and UE. For example, on the uplink, a BPL includes a transmit beam on the UE and a receive beam on the base station. The base station and UE may select one or more beams forming BPLs for communication of uplink and downlink signals therebetween using a downlink beam management scheme and/or an uplink beam management scheme. In an example of uplink beam management scheme, uplink beams (e.g., an uplink BPL) may be selected by the base station based on received beamformed uplink reference signals, such as SRSs. When the channel is reciprocal, the base station may further derive the downlink beams (e.g., a downlink BPL) to communicate with the UE based on the received SRSs.

The UE may transmit the SRSs in accordance with SRS resources configured by the base station. An SRS resource defines the time-frequency resource location and other parameters associated with transmission of the SRS. One or more SRS resources may be included in an SRS resource set that may be configured to enable aperiodic, semi-persistent, or periodic transmission of SRSs generated based on the SRS resources within the SRS resource set.

BRIEF SUMMARY

The following presents a summary of one or more aspects of the present disclosure, in order to provide a basic understanding of such aspects. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

In one example, a method for wireless communication at a user equipment (UE) in a wireless communication network is disclosed. The method includes receiving a sounding reference signal (SRS) configuration for an SRS resource set. The SRS resource set can include a plurality of SRS resources associated with multiple transmission and reception points (TRPs). The method further includes transmitting a plurality of SRSs to the multiple TRPs in accordance with the SRS configuration.

Another example provides a UE in a wireless communication network including a memory and a processor coupled to the memory. The processor and the memory can be configured to receive a sounding reference signal (SRS) configuration for an SRS resource set. The SRS resource set can include a plurality of SRS resources associated with multiple transmission and reception points (TRPs). The processor and the memory can further be configured to transmit a plurality of SRSs to the multiple TRPs in accordance with the SRS configuration.

Another example provides a UE in a wireless communication network. The UE can include means for receiving a sounding reference signal (SRS) configuration for an SRS resource set. The SRS resource set can include a plurality of SRS resources associated with multiple transmission and reception points (TRPs). The UE can further include means for transmitting a plurality of SRSs to the multiple TRPs in accordance with the SRS configuration.

Another example provides a non-transitory computer-readable medium including code for causing one or more processors of a UE to receive a sounding reference signal (SRS) configuration for an SRS resource set. The SRS resource set can include a plurality of SRS resources associated with multiple transmission and reception points (TRPs). The non-transitory computer-readable medium can further include code for causing the one or more processors of the UE to transmit a plurality of SRSs to the multiple TRPs in accordance with the SRS configuration.

In another example, a method for wireless communication at a radio access network (RAN) entity in a wireless communication network is disclosed. The method includes transmitting a sounding reference signal (SRS) configuration for an SRS resource set for a user equipment (UE) to the UE. The SRS resource set can include a plurality of SRS resources associated with multiple transmission and reception points (TRPs). The method further includes receiving at least one SRS from the UE in accordance with the SRS configuration.

Another example provides a RAN entity in a wireless communication network including a memory and a processor coupled to the memory. The processor and the memory can be configured to transmit a sounding reference signal (SRS) configuration for an SRS resource set for a user equipment (UE) to the UE. The SRS resource set can include a plurality of SRS resources associated with multiple transmission and reception points (TRPs). The processor and the memory can further be configured to receive at least one SRS from the UE in accordance with the SRS configuration.

Another example provides a RAN entity in a wireless communication network. The RAN entity can include means for transmitting a sounding reference signal (SRS) configuration for an SRS resource set for a user equipment (UE) to the UE. The SRS resource set can include a plurality of SRS resources associated with multiple transmission and reception points (TRPs). The RAN entity can further include means for receiving at least one SRS from the UE in accordance with the SRS configuration.

Another example provides a non-transitory computer-readable medium including code for causing one or more processors of a RAN entity to transmit a sounding reference signal (SRS) configuration for an SRS resource set for a user equipment (UE) to the UE. The SRS resource set can include a plurality of SRS resources associated with multiple transmission and reception points (TRPs). The non-transitory computer-readable medium can further include code for causing the one or more processors of the RAN entity to receive at least one SRS from the UE in accordance with the SRS configuration.

In another example, a method for wireless communication at a radio access network (RAN) entity in a wireless communication network is disclosed. The method includes configuring a sounding reference signal (SRS) configuration for an SRS resource set for a user equipment (UE). The SRS resource set can include a plurality of SRS resources associated with multiple transmission and reception points (TRPs). The method further includes transmitting the SRS configuration for the SRS resource set to the UE, and receiving at least one SRS from the UE in accordance with the SRS configuration.

Another example provides a RAN entity in a wireless communication network including a memory and a processor coupled to the memory. The processor and the memory can be configured to configure a sounding reference signal (SRS) configuration for an SRS resource set for a user equipment (UE). The SRS resource set can include a plurality of SRS resources associated with multiple transmission and reception points (TRPs). The processor and the memory can further be configured to transmit the SRS configuration for the SRS resource set to the UE, and receive at least one SRS from the UE in accordance with the SRS configuration.

Another example provides a RAN entity in a wireless communication network. The RAN entity can include means for configuring a sounding reference signal (SRS) configuration for an SRS resource set for a user equipment (UE). The SRS resource set can include a plurality of SRS resources associated with multiple transmission and reception points (TRPs). The RAN entity can further include means for transmitting the SRS configuration for the SRS resource set to the UE, and means for receiving at least one SRS from the UE in accordance with the SRS configuration.

Another example provides a non-transitory computer-readable medium including code for causing one or more processors of a RAN entity to configure a sounding reference signal (SRS) configuration for an SRS resource set for a user equipment (UE). The SRS resource set can include a plurality of SRS resources associated with multiple transmission and reception points (TRPs). The non-transitory computer-readable medium can further include code for causing the one or more processors of the RAN entity to transmit the SRS configuration for the SRS resource set to the UE, and receive at least one SRS from the UE in accordance with the SRS configuration.

These and other aspects will become more fully understood upon a review of the detailed description, which follows. Other aspects, features, and examples will become apparent to those of ordinary skill in the art, upon reviewing the following description of specific, exemplary aspects of in conjunction with the accompanying figures. While features may be discussed relative to certain aspects and figures below, all aspects can include one or more of the advantageous features discussed herein. In other words, while one or more aspects may be discussed as having certain advantageous features, one or more of such features may also be used in accordance with the various aspects discussed herein. In similar fashion, while exemplary aspects may be discussed below as device, system, or method aspects, such exemplary aspects can be implemented in various devices, systems, and methods.

DETAILED DESCRIPTION

Figure 1:
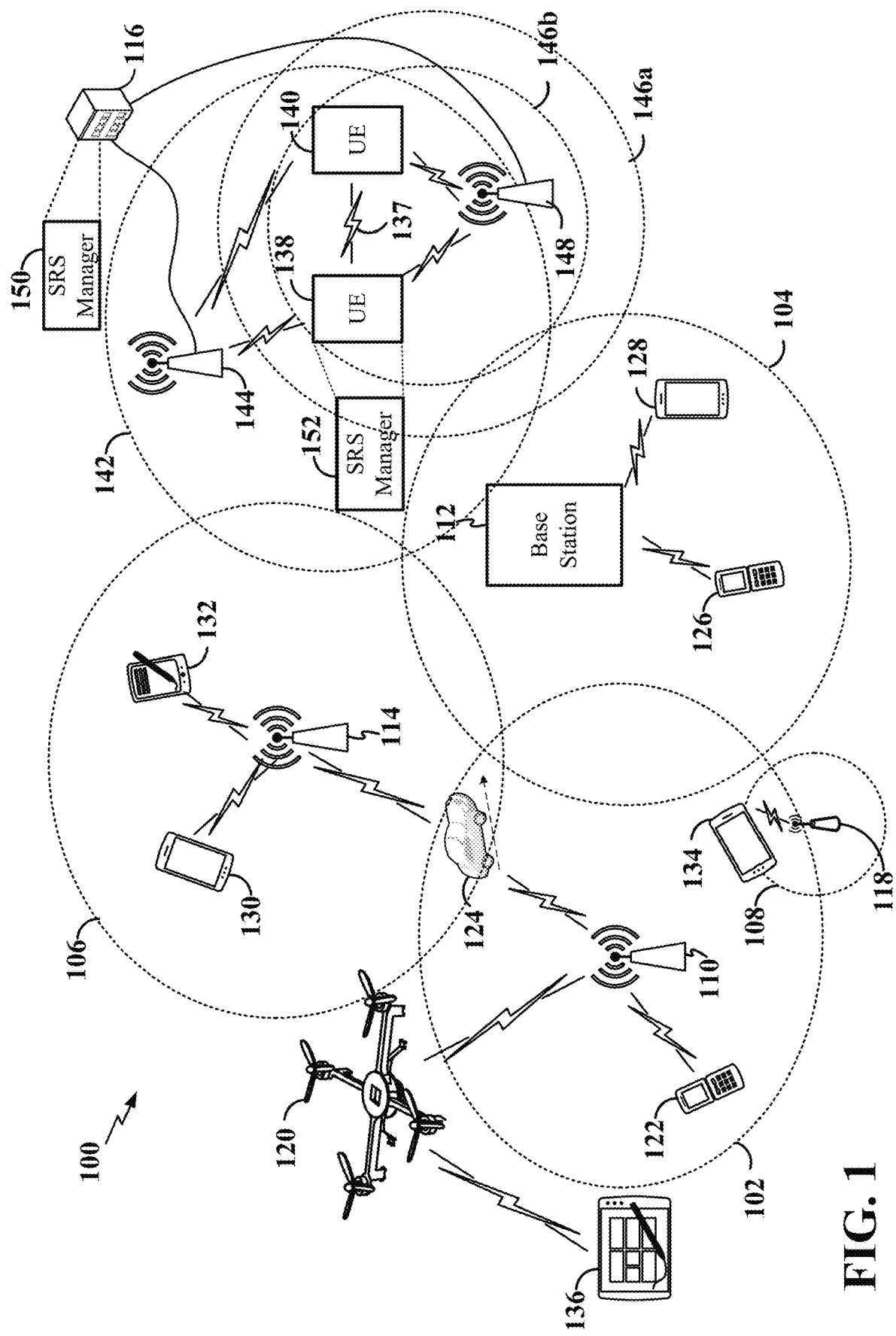
FIG. 1 is a conceptual illustration of an example of a radio access network according to some aspects.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4-a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

While aspects and examples are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, aspects and/or uses may come about via integrated chip examples and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described aspects. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes and constitution.

To facilitate selection of one or more uplink beams for communication of uplink signals from a UE to one or more transmission and reception points (TRPs), the UE may transmit sounding reference signals (SRSs) to each of the TRPs for measurement thereof. Transmission of SRSs to multiple TRPs may be utilized, for example, if the UE is a stationary reduced-capability, where TRP spatial diversity may help mitigate against channel/path blockages or temporary shadowing (e.g., a temporary obstruction) of one TRP (e.g., TRP). In addition, in cases where the UE is stationary and rotating (e.g., the UE is a video surveillance camera), the UE may be exposed to the coverage of the multiple TRPs while rotating and the UE may perform selection of uplink beams among the TRPs. Furthermore, if the UE is configured for Layer 1 (L1)-based cell mobility where L1 messages instead of RRC messages are used for handover between TRPs belonging to the same base station (e.g., gNode B (gNB)), the UE may obtain SRS measurements from multiple TRPs for handover and beam selection.

In some examples, the UE may be configured with separate SRS resource sets for each of the TRPs. In this example, to collect SRS measurements on, for example, two TRPs, the UE may transmit a first set of SRSs to a first TRP using a first SRS resource set configured for the first TRP and then subsequently transmit a second set of SRSs to a second TRP using a second, different SRS resource set configured for the second TRP. Using two separate SRS resource sets, one for each TRP, delays SRS measurements and increases resource usage.

Various aspects of the disclosure relate to configuration of a single SRS resource set for a UE that includes SRS resources associated with multiple, different TRPs. A radio access network (RAN) entity, which may be associated with one or more of the TRPs, may configure an SRS configuration for the SRS resource set and transmit the SRS configuration to the UE. The UE may then transmit a plurality of SRS(s) to the multiple TRPs in accordance with the SRS configuration.

The SRS resource set may be configured as a periodic SRS resource set, a semi-persistent SRS resource set, or triggered aperiodically. In some examples, the TRPs may belong to the same cell or to different cells. In addition, the TRPs may belong to the same timing advance group (TAG) or to different TAGs. In examples in which the TRPs belong to different TAGs, a gap length between the respective SRS resources associated with each of the TRPs may be provided to accommodate the different timing advances to be applied to the SRS resources. In some examples, the gap length may be determined as a function of the different timing advance commands received for each of the TAGs. In other examples, the gap length may be configured by the RAN entity.

In some examples, a quasi co-location (QCL) association for the SRS resources may be the same or different between the TRPs. In examples in which the QCL association for the SRS resources is different between the TRPs, a gap length between the respective SRS resources associated with each of the TRPs may be provided to enable antenna port switching between the SRS resources associated with the different TRPs. In some examples, the gap length may be based on a capability of the UE. In other examples, the gap length may be configured by the RAN entity.

The transmit power for the SRS resources may be controlled per TRP or a common transmit power may be used for all TRPs. For example, the UE may receive multiple transmit power control (TPC) commands, each associated with a TRP of the multiple TRPs and transmit the SRSs to the multiple TRPs utilizing a respective transmit power for each of the TRPs based on the TPC commands. As another example, the UE may receive a single TPC command applicable to each of the TRPs and transmit the SRSs to the multiple TRPs utilizing the same transmit power based on the single TPC command. In some examples, the single TPC command is received for a set of SRS resources associated with one of the TRPs, and the UE may apply the TPC command to the SRS resources associated with the other TRPs.

The SRS configuration may define the SRS resource set parameters for the SRS resource set. For example, each SRS resource may be configured by a set of SRS resource parameters. SRS resource parameters may include, for example, a set of port(s), bandwidth, number of symbols, transmission comb structure (e.g., the SRS is transmitted every Nth subcarrier, where N=2 or 4), repetition, starting symbol, etc. The SRS resource parameters for each of the SRS resources collectively form the SRS resource set parameters included in the SRS configuration. In addition, the SRS configuration may further include additional parameters applicable to the SRS resource set as a whole. For example, the SRS configuration for an aperiodic SRS resource set may further include a trigger state for triggering the aperiodic SRS resource set, a slot offset between the downlink control information (DCI) including the trigger state and transmission of the SRS, and a channel state information reference signal (CSI-RS) resource identifier (CRI) associated with the aperiodic SRS resource set. As another example, the SRS configuration for a periodic or semi-persistent SRS resource set may indicate the periodicity of transmission of SRSs.

In some examples, the SRS configuration may include a common set of SRS resource set parameters for the multiple TRPs. For example, the SRS configuration may configure an SRS resource set including one or more SRS resources that each include common SRS resource parameters (e.g., transmission comb structure, port(s), number of symbols, repetition, etc.). In this example, the starting symbol may be indicated separately or a rule may be defined to indicate the starting symbol. In addition, each of the SRS resources in the common SRS resource set would be associated with the same beam. In some examples, when using a common set of SRS resource set parameters, each SRS resource in the SRS resource set may be associated with all of the TRPs. For example, each TRP may receive all of the SRS(s) configured in the SRS resource set. In other examples, each SRS resource in the SRS resource set including the common SRS resource set parameters may be associated with a particular TRP. In other examples, the SRS configuration may include a respective set of SRS resource set parameters for each of the multiple TRPs. For example, the SRS configuration can include a plurality of TRP SRS configurations, each associated with a respective TRP. Each TRP SRS configuration may configure one or more SRS resources associated with a particular TRP, where the SRS resource parameters may vary between the TRP SRS configurations. Thus, each TRP SRS configuration includes the SRS resource set parameters configuring the particular SRS resources for that TRP.

The SRS configuration may be provided to the UE in a radio resource control (RRC) message transmitted to the UE. In some examples, the RRC message may include a single RRC configuration (e.g., a single RRC configuration information element (IE)) including the SRS configuration. For example, the RRC configuration may include a sequence of TRP SRS configurations. In examples in which the SRS configuration includes a common set of SRS resource set parameters, the sequence may have a length of one (e.g., a single TRP SRS configuration including common SRS resource set parameters). In other examples, the RRC message may include multiple RRC configurations, each including one of the TRP SRS configurations. In examples in which the SRS resource set is an aperiodic SRS resource set, the SRS configuration may be triggered using a codepoint that points to the single RRC configuration or to the multiple RRC configurations. By utilizing a single SRS resource set for a UE that includes SRS resources associated with multiple, different TRPs, delays in SRS measurements may be reduced, thus resulting in lower latency for uplink beam selection. In addition, downlink resource usage may further be reduced by transmitting a single SRS configuration for multiple TRPs to the UE.

The various concepts presented throughout this disclosure may be implemented across a broad variety of telecommunication systems, network architectures, and communication standards. Referring now to FIG. 1, as an illustrative example without limitation, a schematic illustration of a radio access network 100 is provided. The RAN 100 may implement any suitable wireless communication technology or technologies to provide radio access. As one example, the RAN 100 may operate according to $3^{rd}$ Generation Partnership Project (3GPP) New Radio (NR) specifications, often referred to as 5G. As another example, the RAN 100 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. Of course, many other examples may be utilized within the scope of the present disclosure.

The geographic region covered by the radio access network 100 may be divided into a number of cellular regions (cells) that can be uniquely identified by a user equipment (UE) based on an identification broadcasted over a geographical area from one access point or base station. FIG. 1 illustrates macrocells 102, 104, 106, 142, and 146a/146b, and a small cell 108, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In general, a respective base station (BS) serves each cell. Broadly, a base station is a network element or entity in a radio access network responsible for radio transmission and reception in one or more cells to or from a UE. A BS may also be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), a transmission and reception point (TRP), or some other suitable terminology.

In FIG. 1, three base stations 110, 112, and 114 are shown in cells 102, 104, and 106, respectively; and a fourth base station 116 is shown controlling remote radio heads (RRHs) 144 and 148 in cells 142 and 146a/146b. That is, a base station can have an integrated antenna or can be connected to an antenna or RRH by feeder cables. In the illustrated example, the cells 102, 104, 106, 142, and 146a/146b may be referred to as macrocells, as the base stations 110, 112, 114, and 116 support cells having a large size. Further, a base station 118 is shown in the small cell 108 (e.g., a microcell, picocell, femtocell, home base station, home Node B, home eNode B, etc.) which may overlap with one or more macrocells. In this example, the cell 108 may be referred to as a small cell, as the base station 118 supports a cell having a relatively small size. Cell sizing can be done according to system design as well as component constraints. It is to be understood that the radio access network 100 may include any number of wireless base stations and cells. Further, a relay node may be deployed to extend the size or coverage area of a given cell. The base stations 110, 112, 114, 116, and 118 provide wireless access points to a core network for any number of mobile apparatuses.

FIG. 1 further includes an unmanned aerial vehicle (UAV) 120, such as a quadcopter or drone, which may be configured to function as a base station. That is, in some examples, a cell may not necessarily be stationary, and the geographic area of the cell may move according to the location of a mobile base station such as the UAV 120.

In general, base stations may include a backhaul interface for communication with a backhaul portion (not shown) of the network. The backhaul may provide a link between a base station and a core network (not shown), and in some examples, the backhaul may provide interconnection between the respective base stations. The core network may be a part of a wireless communication system and may be independent of the radio access technology used in the radio access network. Various types of backhaul interfaces may be employed, such as a direct physical connection, a virtual network, or the like using any suitable transport network.

The RAN 100 is illustrated supporting wireless communication for multiple mobile apparatuses. A mobile apparatus is commonly referred to as user equipment (UE) in standards and specifications promulgated by the 3rd Generation Partnership Project (3GPP), but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services.

Within the present document, a "mobile" apparatus need not necessarily have a capability to move, and may be stationary. The term mobile apparatus or mobile device broadly refers to a diverse array of devices and technologies. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc., an industrial automation and enterprise device, a logistics controller, agricultural equipment, etc. Still further, a mobile apparatus may provide for connected medicine or telemedicine support, i.e., health care at a distance. Telehealth devices may include telehealth monitoring devices and telehealth administration devices, whose communication may be prioritized access over other types of information, e.g., in terms of prioritized access for transport of critical service data, and/or relevant QoS for transport of critical service data.

Within the RAN 100, the cells may include UEs that may be in communication with one or more sectors of each cell. For example, UEs 122 and 124 may be in communication with base station 110; UEs 126 and 128 may be in communication with base station 112; UEs 130 and 132 may be in communication with base station 114; UE 134 may be in communication with base station 118; UEs 138 and 140 may be in communication with base station 116 via one or more of the RRHs 144 and 148; and UE 136 may be in communication with mobile base station 120. Here, each base station 110, 112, 114, 116, 118, and 120 may be configured to provide an access point to a core network (not shown) for all the UEs in the respective cells. In another example, a mobile network node (e.g., UAV 120) may be configured to function as a UE. For example, the UAV 120 may operate within cell 102 by communicating with base station 110.

In some examples, access to the air interface may be scheduled, wherein a scheduling entity (e.g., a base station 112) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs (e.g., UE 126), which may be scheduled entities, may utilize resources allocated by the scheduling entity 112.

Base stations are not the only entities that may function as scheduling entities. That is, in some examples, a UE may function as a scheduling entity, scheduling resources for one or more scheduled entities (e.g., one or more other UEs). And as discussed more below, UEs may communicate directly with other UEs in peer-to-peer (P2P) fashion and/or in relay configuration.

In a further aspect of the RAN 100, sidelink signals may be used between UEs without necessarily relying on scheduling or control information from a base station. For example, two or more UEs (e.g., UEs 138 and 140) may communicate with each other using peer to peer (P2P) or sidelink signals 137 without relaying that communication through a base station (e.g., base station 144). In some examples, the sidelink signals 137 include sidelink traffic and sidelink control. In some examples, the UEs 138 and 140 may each function as a scheduling entity or an initiating (e.g., transmitting) sidelink device and/or a scheduled entity or a receiving sidelink device. For example, the UEs 138 and 140 may function as scheduling entities or scheduled entities in a P2P network, a device-to-device (D2D), vehicle-to-vehicle (V2V) network, a vehicle-to-everything (V2X), a mesh network, or other suitable network.

In the RAN 100, the ability for a UE to communicate while moving, independent of their location, is referred to as mobility. The various physical channels between the UE and the RAN are generally set up, maintained, and released under the control of an access and mobility management function (AMF), which may include a security context management function (SCMF) that manages the security context for both the control plane and the user plane functionality and a security anchor function (SEAF) that performs authentication. In some examples, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 124 may move from the geographic area corresponding to its serving cell 102 to the geographic area corresponding to a neighbor cell 106. When the signal strength or quality from the neighbor cell 106 exceeds that of its serving cell 102 for a given amount of time, the UE 124 may transmit a reporting message to its serving base station 110 indicating this condition. In response, the UE 124 may receive a handover command, and the UE may undergo a handover to the cell 106.

Wireless communication between a RAN 100 and a UE (e.g., UE 122 or 124) may be described as utilizing an air interface. Transmissions over the air interface from a base station (e.g., base station 110) to one or more UEs (e.g., UE 122 and 124) may be referred to as downlink (DL) transmission. In accordance with certain aspects of the present disclosure, the term downlink may refer to a point-to-multipoint transmission originating at a scheduling entity (described further below; e.g., base station 110). Another way to describe this scheme may be to use the term broadcast channel multiplexing. Transmissions from a UE (e.g., UE 122) to a base station (e.g., base station 110) may be referred to as uplink (UL) transmissions. In accordance with further aspects of the present disclosure, the term uplink may refer to a point-to-point transmission originating at a scheduled entity (described further below; e.g., UE 122).

For example, DL transmissions may include unicast or broadcast transmissions of control information and/or data (e.g., user data traffic or other type of traffic) from a base station (e.g., base station 110) to one or more UEs (e.g., UEs 122 and 124), while UL transmissions may include transmissions of control information and/or traffic information originating at a UE (e.g., UE 122). In addition, the uplink and/or downlink control information and/or traffic information may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols. A subframe may refer to a duration of 1 ms. Multiple subframes or slots may be grouped together to form a single frame or radio frame. Within the present disclosure, a frame may refer to a predetermined duration (e.g., 10 ms) for wireless transmissions, with each frame consisting of, for example, 10 subframes of 1 ms each. Of course, these definitions are not required, and any suitable scheme for organizing waveforms may be utilized, and various time divisions of the waveform may have any suitable duration.

The air interface in the RAN 100 may utilize one or more multiplexing and multiple access algorithms to enable simultaneous communication of the various devices. For example, 5G NR specifications provide multiple access for UL or reverse link transmissions from UEs 122 and 124 to base station 110, and for multiplexing DL or forward link transmissions from the base station 110 to UEs 122 and 124 utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 110 to UEs 122 and 124 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Further, the air interface in the RAN 100 may utilize one or more duplexing algorithms Duplex refers to a point-to-point communication link where both endpoints can communicate with one another in both directions. Full-duplex means both endpoints can simultaneously communicate with one another. Half-duplex means only one endpoint can send information to the other at a time. Half-duplex emulation is frequently implemented for wireless links utilizing time division duplex (TDD). In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot. In a wireless link, a full-duplex channel generally relies on physical isolation of a transmitter and receiver, and suitable interference cancellation technologies. Full-duplex emulation is frequently implemented for wireless links by utilizing frequency division duplex (FDD) or spatial division duplex (SDD). In FDD, transmissions in different directions may operate at different carrier frequencies (e.g., within paired spectrum). In SDD, transmissions in different directions on a given channel are separated from one another using spatial division multiplexing (SDM). In other examples, full-duplex communication may be implemented within unpaired spectrum (e.g., within a single carrier bandwidth), where transmissions in different directions occur within different sub-bands of the carrier bandwidth. This type of full-duplex communication may be referred to herein as sub-band full duplex (SBFD), also known as flexible duplex.

In various implementations, the air interface in the RAN 100 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

In some examples, a UE (e.g., UE 138) may be in the coverage area of more than one cell (e.g., cells 142, 146*a*, and 146*b*). In this example, each RRH 144 and 148 may function as a transmission and reception point (TRP) in a coordinated multi-point (CoMP), multi-radio access technology (RAT) dual connectivity (DC), or New Radio (NR) DC network configuration in which downlink and/or uplink signals may be transmitted between the UE 138 and each of the TRPs 144 and 148. In the example shown in FIG. 1, RRH 148 may include two co-located TRPs, each serving one of the cells 146*a* and 146*b*. Each cell 146*a* and 146*b* may communicate using a respective radio access technology (RAT) and/or frequency range. For example, downlink data may be simultaneously transmitted to the UE 138 from each of the TRPs 144 and 148 (e.g., via cells 142, 146*a*, and 146*b*) to reduce interference, increase the data rate, and/or increase the received power. As another example, downlink signals may be transmitted from one TRP (e.g., TRP 148 via cells 146*a* and 146*b*) and uplink signals may be received at another TRP (e.g., TRP 144 via cell 142). In some examples, the TRPs 144 and 148 may be configured using a centralized RAN architecture in which base station 116 operates to coordinate transmissions and receptions between the UE 138 and TRPs 144 and 148 over cells 142, 146*a*, and 146*b*.

In addition, beamformed signals may be utilized between the UE 138 and each of the TRPs 144 and 148 communicating, for example, over a mmWave carrier. To facilitate transmission of uplink signals from the UE to one or both of the TRPs using uplink beams, the base station 116 may coordinate an uplink beam management scheme in which the UE 138 may transmit uplink reference signals, such as sounding reference signals (SRSs) to each of the TRPs 144 and 148. Based on the SRS measurements, the base station 116 may select one or more uplink beams for the UE 138 to transmit uplink signals to one or more of the TRPs 144 and 148. The UE 138 may transmit the SRSs in accordance with SRS resources configured by the base station 116. An SRS resource defines the time-frequency resource location and other parameters associated with transmission of the SRS.

To simplify the configuration of SRS resources across multiple TRPs 144 and 148, in various aspects of the disclosure, the base station 116 may include an SRS manager 150 for configuring an SRS resource set including SRS resources associated with each of the TRPs 144 and 148. The base station 116 may then transmit an SRS configuration of the SRS resource set to the UE 138 via, for example, TRP 144. In addition, the UE 138 may further include an SRS manager 152 configured to use the SRS configuration to generate and transmit a plurality of SRSs to the multiple TRPs 144 and 148. For example, each of the TRPs 144 and 148 may receive at least one of the SRSs transmitted by the UE 138 in accordance with the SRS configuration.

Various aspects of the present disclosure will be described with reference to an OFDM waveform, schematically illustrated in FIG. 2. It should be understood by those of ordinary skill in the art that the various aspects of the present disclosure may be applied to an SC-FDMA waveform in substantially the same way as described herein below. That is, while some examples of the present disclosure may focus on an OFDM link for clarity, it should be understood that the same principles may be applied as well to SC-FDMA waveforms.

Figure 2:
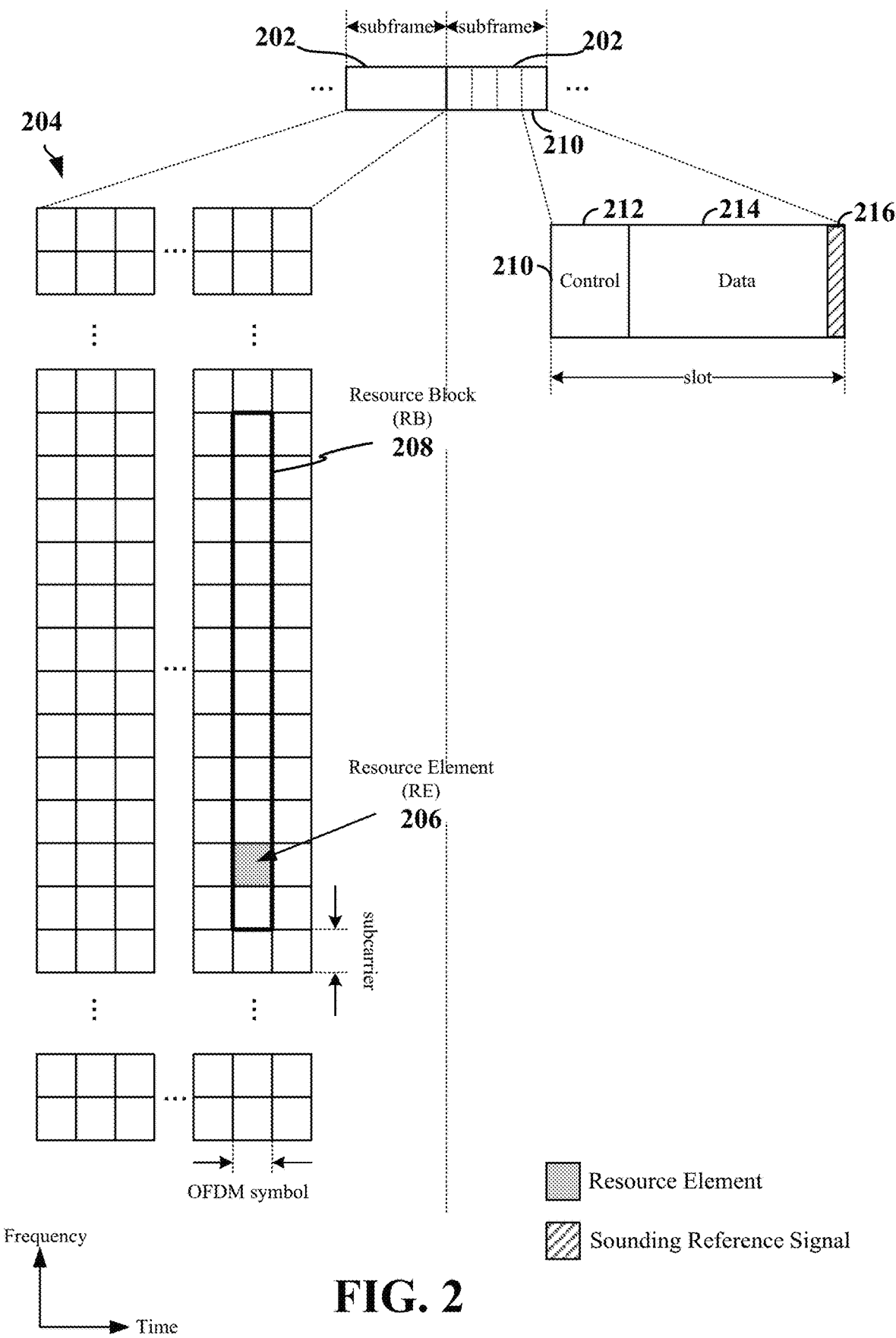
FIG. 2 is a diagram illustrating an example of a frame structure for use in a radio access network according to some aspects.

Referring now to FIG. 2, an expanded view of an exemplary DL subframe 202 is illustrated, showing an OFDM resource grid. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers.

The resource grid 204 may be used to schematically represent time-frequency resources for a given antenna port. That is, in a multiple-input-multiple-output (MIMO) implementation with multiple antenna ports available, a corresponding multiple number of resource grids 204 may be available for communication. The resource grid 204 is divided into multiple resource elements (REs) 206. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or a resource block (RB) 208, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 208 entirely corresponds to a single direction of communication (either transmission or reception for a given device).

Scheduling of UEs or sidelink devices (hereinafter collectively referred to as UEs) for downlink, uplink, or sidelink transmissions typically involves scheduling one or more resource elements 206 within one or more sub-bands or bandwidth parts (BWPs). Thus, a UE generally utilizes only a subset of the resource grid 204. In some examples, an RB may be the smallest unit of resources that can be allocated to a UE. Thus, the more RBs scheduled for a UE, and the higher the modulation scheme chosen for the air interface, the higher the data rate for the UE. The RBs may be scheduled by a base station (e.g., gNB, eNB, etc.) or may be self-scheduled by a UE/sidelink device implementing D2D sidelink communication.

Scheduling of the resources (e.g., REs 206/RBs 208) to transmit control and/or traffic information may be performed in a dynamic manner or a semi-persistent manner. For example, the scheduling entity (e.g., base station) may dynamically allocate a set of REs 206/RBs 208 for the transmission of downlink control and/or data to the UE or for the transmission of uplink control and/or data from the UE. The base station may further semi-persistently allocate a set of REs 206/RBs 208 for periodic downlink or uplink transmissions. Generally, semi-persistent scheduling (SPS) may be used for periodic communications based on defined settings. For example, SPS may be suitable for applications with small, predictable, and/or periodic payloads, such as voice over Internet protocol (VoIP) applications. On the uplink, an SPS resource may be referred to as a configured grant (CG). With CGs, scheduling information corresponding to the uplink CG may be signaled just once to the UE. Subsequently, without needing to receive additional scheduling information, the UE may periodically utilize the resources allocated in the uplink CG. The periodicity with which the UE may transmit user data traffic via the semi-persistently scheduled resources may be established when the CG is initially configured.

In this illustration, the RB 208 is shown as occupying less than the entire bandwidth of the subframe 202, with some subcarriers illustrated above and below the RB 208. In a given implementation, the subframe 202 may have a bandwidth corresponding to any number of one or more RBs 208. Further, in this illustration, the RB 208 is shown as occupying less than the entire duration of the subframe 202, although this is merely one possible example.

Each 1 ms subframe 202 may consist of one or multiple adjacent slots. In the example shown in FIG. 2, one subframe 202 includes four slots 210, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots, sometimes referred to as shortened transmission time intervals (TTIs), having a shorter duration (e.g., one to three OFDM symbols). These mini-slots or shortened transmission time intervals (TTIs) may in some cases be transmitted occupying resources scheduled for ongoing slot transmissions for the same or for different UEs. Any number of resource blocks may be utilized within a subframe or slot.

An expanded view of one of the slots 210 illustrates the slot 210 including a control region 212 and a data region 214. In general, the control region 212 may carry control channels, and the data region 214 may carry data channels. In the example shown in FIG. 2, the control region 212 may include downlink control information and the data region 214 may include downlink data channels or uplink data channels. In addition, the slot 210 further includes an uplink sounding reference signal (SRS) 216 shown transmitted at an end of the slot 210. For example, the SRS 216 may be transmitted over one or more symbols within the last six symbols of the slot 210. Of course, a slot may contain all DL, all UL, or at least one DL portion and at least one UL portion. The structure illustrated in FIG. 2 is merely exemplary in nature, and different slot structures may be utilized, and may include one or more of each of the control region(s) and data region(s).

Although not illustrated in FIG. 2, the various REs 206 within an RB 208 may be scheduled to carry one or more physical channels, including control channels, shared channels, data channels, etc. Other REs 206 within the RB 208 may also carry pilots or reference signals. These pilots or reference signals may provide for a receiving device to perform channel estimation of the corresponding channel, which may enable coherent demodulation/detection of the control and/or data channels within the RB 208.

In some examples, the slot 210 may be utilized for broadcast or unicast communication. For example, a broadcast, multicast, or groupcast communication may refer to a point-to-multipoint transmission by one device (e.g., a base station, UE, or other similar device) to other devices. Here, a broadcast communication is delivered to all devices, whereas a multicast communication is delivered to multiple intended recipient devices. A unicast communication may refer to a point-to-point transmission by a one device to a single other device.

In an example of cellular communication over a cellular carrier via a Uu interface, for a DL transmission, the scheduling entity (e.g., a base station) may allocate one or more REs 206 (e.g., within the control region 212) to carry DL control information including one or more DL control channels, such as a physical downlink control channel (PDCCH), to one or more scheduled entities (e.g., UEs). The PDCCH carries downlink control information (DCI) including but not limited to power control commands (e.g., one or more open loop power control parameters and/or one or more closed loop power control parameters), scheduling information, a grant, and/or an assignment of REs for DL and UL transmissions. The PDCCH may further carry HARQ feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission is confirmed, an ACK may be transmitted, whereas if not confirmed, a NACK may be transmitted. In response to a NACK, the transmitting device may send a HARQ retransmission, which may implement chase combining, incremental redundancy, etc.

The base station may further allocate one or more REs 206 (e.g., in the control region 212 or the data region 214) to carry other DL signals, such as a demodulation reference signal (DMRS); a phase-tracking reference signal (PT-RS); a channel state information (CSI) reference signal (CSI-RS); a primary synchronization signal (PSS); and a secondary synchronization signal (SSS). A UE may utilize the PSS and SSS to achieve radio frame, subframe, slot, and symbol synchronization in the time domain, identify the center of the channel (system) bandwidth in the frequency domain, and identify the physical cell identity (PCI) of the cell. The synchronization signals PSS and SSS, and in some examples, the PBCH and a PBCH DMRS, may be transmitted in a synchronization signal block (SSB). The PBCH may further include a master information block (MIB) that includes various system information, along with parameters for decoding a system information block (SIB). The SIB may be, for example, a SystemInformationType 1 (SIB1) that may include various additional system information. Examples of system information transmitted in the MIB may include, but are not limited to, a subcarrier spacing, system frame number, a configuration of a PDCCH control resource set (CORESET) (e.g., PDCCH CORESET0), and a search space for SIB1. Examples of additional system information transmitted in the SIB1 may include, but are not limited to, a random access search space, downlink configuration information, and uplink configuration information. The MIB and SIB1 together provide the minimum system information (SI) for initial access.

In an UL transmission, the scheduled entity (e.g., UE) may utilize one or more REs 206 (e.g., within the control region 212, which may be at the end of the slot 210) to carry UL control information (UCI) including one or more UL control channels, such as a physical uplink control channel (PUCCH), to the scheduling entity. UCI may include a variety of packet types and categories. In some examples, the UCI may include a scheduling request (SR), i.e., request for the scheduling entity to schedule uplink transmissions.

Here, in response to the SR transmitted on the UCI, the scheduling entity may transmit downlink control information (DCI) that may schedule resources for uplink packet transmissions. UCI may also include HARQ feedback, channel state feedback (CSF), such as a CSI report, or any other suitable UCI. The scheduled entity (e.g., UE) may further utilize one or more REs 206 (e.g., within the control region 212 and/or the data region 214) to transmit pilots, reference signals, and other information configured to enable or assist in decoding uplink data transmissions and/or in uplink beam management, such as one or more DMRSs and SRSs 216.

In addition to control information, one or more REs 206 (e.g., within the data region 214) may be allocated for data traffic. Such data traffic may be carried on one or more traffic channels, such as, for a DL transmission, a physical downlink shared channel (PDSCH); or for an UL transmission, a physical uplink shared channel (PUSCH). In some examples, one or more REs 206 within the data region 214 may be configured to carry other signals, such as one or more SIBs and DMRSs.

In an example of sidelink communication over a sidelink carrier via a PC5 interface, the control region 212 of the slot 210 may include a physical sidelink control channel (PSCCH) including sidelink control information (SCI) transmitted by an initiating (transmitting) sidelink device (e.g., V2X or other sidelink device) towards a set of one or more other receiving sidelink devices. The data region 214 of the slot 210 may include a physical sidelink shared channel (PSSCH) including sidelink data traffic transmitted by the initiating (transmitting) sidelink device within resources reserved over the sidelink carrier by the transmitting sidelink device via the SCI. Other information may further be transmitted over various REs 206 within slot 210. For example, HARQ feedback information may be transmitted in a physical sidelink feedback channel (PSFCH) within the slot 210 from the receiving sidelink device to the transmitting sidelink device. In addition, one or more reference signals, such as a sidelink SSB and/or a sidelink CSI-RS, may be transmitted within the slot 210.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

The channels or carriers described above in connection with FIGS. 1 and 2 are not necessarily all of the channels or carriers that may be utilized between a scheduling entity and scheduled entities, and those of ordinary skill in the art will recognize that other channels or carriers may be utilized in addition to those illustrated, such as other traffic, control, and feedback channels.

Figure 3:
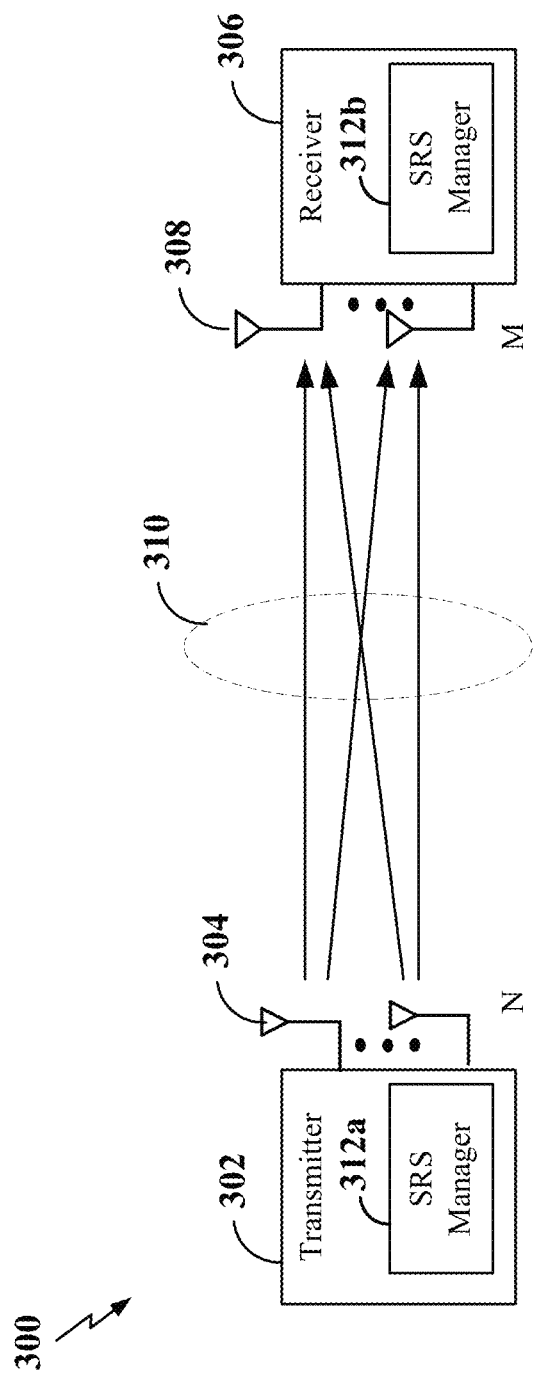
FIG. 3 is a block diagram illustrating a wireless communication system supporting beamforming and/or multiple-input multiple-output (MIMO) communication according to some aspects.

In some aspects of the disclosure, the scheduling entity and/or scheduled entity may be configured for beamforming and/or multiple-input multiple-output (MIMO) technology. FIG. 3 illustrates an example of a wireless communication system 300 supporting beamforming and/or MIMO. In a MIMO system, a transmitter 302 includes multiple transmit antennas 304 (e.g., N transmit antennas) and a receiver 306 includes multiple receive antennas 308 (e.g., M receive antennas). Thus, there are N×M signal paths 310 from the transmit antennas 304 to the receive antennas 308. Each of the transmitter 302 and the receiver 306 may be implemented, for example, within a scheduling entity, a scheduled entity, or any other suitable wireless communication device.

The use of such multiple antenna technology enables the wireless communication system to exploit the spatial domain to support spatial multiplexing, beamforming, and transmit diversity. Spatial multiplexing may be used to transmit different streams of data, also referred to as layers, simultaneously on the same time-frequency resource. The data streams may be transmitted to a single UE to increase the data rate or to multiple UEs to increase the overall system capacity, the latter being referred to as multi-user MIMO (MU-MIMO). This is achieved by spatially precoding each data stream (i.e., multiplying the data streams with different weighting and phase shifting) and then transmitting each spatially precoded stream through multiple transmit antennas on the downlink. The spatially precoded data streams arrive at the UE(s) with different spatial signatures, which enables each of the UE(s) to recover the one or more data streams destined for that UE. On the uplink, each UE transmits a spatially precoded data stream, which enables the base station to identify the source of each spatially precoded data stream.

The number of data streams or layers corresponds to the rank of the transmission. In general, the rank of the MIMO system 300 is limited by the number of transmit or receive antennas 304 or 308, whichever is lower. In addition, the channel conditions at the UE, as well as other considerations, such as the available resources at the base station, may also affect the transmission rank. For example, the rank (and therefore, the number of data streams) assigned to a particular UE on the downlink may be determined based on the rank indicator (RI) transmitted from the UE to the base station. The RI may be determined based on the antenna configuration (e.g., the number of transmit and receive antennas) and a measured signal-to-interference-and-noise ratio (SINR) on each of the receive antennas. The RI may indicate, for example, the number of layers that may be supported under the current channel conditions. The base station may use the RI, along with resource information (e.g., the available resources and amount of data to be scheduled for the UE), to assign a transmission rank to the UE.

In one example, as shown in FIG. 3, a rank-2 spatial multiplexing transmission on a 2×2 MIMO antenna configuration will transmit one data stream from each transmit antenna 304. Each data stream reaches each receive antenna 308 along a different signal path 310. The receiver 306 may then reconstruct the data streams using the received signals from each receive antenna 308.

Beamforming is a signal processing technique that may be used at the transmitter 302 or receiver 306 to shape or steer an antenna beam (e.g., a transmit beam or receive beam) along a spatial path between the transmitter 302 and the receiver 306. Beamforming may be achieved by combining the signals communicated via antennas 304 or 308 (e.g., antenna elements of an antenna array) such that some of the signals experience constructive interference while others experience destructive interference. To create the desired constructive/destructive interference, the transmitter 302 or receiver 306 may apply amplitude and/or phase offsets to signals transmitted or received from the antenna elements 304 or 308 associated with the transmitter 302 or receiver 306. In some examples, the antenna elements may be mapped to antenna ports for generation of beams. Here, the term antenna port refers to a logical port (e.g., a beam) over which a signal (e.g., a data stream or layer) may be transmitted. In an example of a base station, an antenna array may include 128 antenna elements (e.g., within a 16×8 array) that may be mapped to 32 antenna ports by an 8×1 combiner.

To facilitate transmission of SRSs using uplink beams from, for example, a transmitter 302 to a receiver 306, each of the transmitter 302 and receiver 306 may include a respective SRS manager 312a and 312b configured to utilize an SRS configuration for an SRS resource set including SRS resources associated with multiple TRPs. For example, the SRS manager 312b in the receiver 306 may be configured to generate the SRS configuration and provide the SRS configuration to the transmitter 302. In addition, the SRS manager 312a in the transmitter 302 may be configured to utilize the SRS configuration to generate a plurality of SRSs for transmission towards multiple receivers 306 (one of which is shown in FIG. 3).

In 5G New Radio (NR) systems, particularly for above 6 GHz or mmWave systems, beamformed signals may be utilized for most downlink channels, including the physical downlink control channel (PDCCH) and physical downlink shared channel (PDSCH). In addition, broadcast control information, such as the SSB, slot format indicator (SFI), and paging information, may be transmitted in a beam-sweeping manner to enable all scheduled entities (UEs) in the coverage area of a transmission and reception point (TRP) (e.g., a gNB) to receive the broadcast control information. In addition, for UEs configured with beamforming antenna arrays, beamformed signals may also be utilized for uplink channels, including the physical uplink control channel (PUCCH) and physical uplink shared channel (PUSCH). However, it should be understood that beamformed signals may also be utilized by enhanced mobile broadband (eMBB) gNBs for sub-6 GHz systems.

A base station (e.g., gNB) may generally be capable of communicating with UEs using transmit beams (e.g., downlink transmit beams) of varying beam widths. For example, a base station may be configured to utilize a wider beam when communicating with a UE that is in motion and a narrower beam when communicating with a UE that is stationary. The UE may further be configured to utilize one or more downlink receive beams to receive signals from the base station. In some examples, to select one or more downlink transmit beams and one or more downlink receive beams for communication with a UE, the base station may transmit a reference signal, such as an SSB or CSI-RS, on each of a plurality of downlink transmit beams in a beam-sweeping manner. The UE may measure the reference signal received power (RSRP) on each of the downlink transmit beams using one or more downlink receive beams on the UE and transmit a Layer 1 (L1) measurement report to the base station indicating the RSRP of one or more of the measured downlink transmit beams. The base station may then select one or more serving downlink beams (e.g., downlink transmit beams and downlink receive beams) for communication with the UE based on the L1 measurement report. The resulting selected downlink transmit beam and downlink receive beam may form a downlink beam pair link. In other examples, when the channel is reciprocal, the base station may derive the particular downlink beam(s) to communicate with the UE based on uplink measurements of one or more uplink reference signals, such as sounding reference signals (SRSs).

Similarly, uplink beams (e.g., uplink transmit beam(s) at the UE and uplink receive beam(s) at the base station) may be selected by measuring the RSRP of received uplink reference signals (e.g., SRSs) or downlink reference signals (e.g., SSBs or CSI-RSs) during an uplink or downlink beam sweep. For example, the base station may determine the uplink beams either by uplink beam management via an SRS beam sweep with measurement at the base station or by downlink beam management via an SSB/CSI-RS beam sweep with measurement at the UE. The selected uplink beam may be indicated by a selected SRS resource identifier (SRI) when implementing uplink beam management or a selected SSB/CSI-RS resource when implementing downlink beam management. For example, the selected SSB/CSI-RS resource can have a spatial relation to the selected uplink transmit beam (e.g., the uplink transmit beam utilized for the PUCCH, SRS, and/or PUSCH). The resulting selected uplink transmit beam and uplink receive beam may form an uplink beam pair link.

Figure 4:
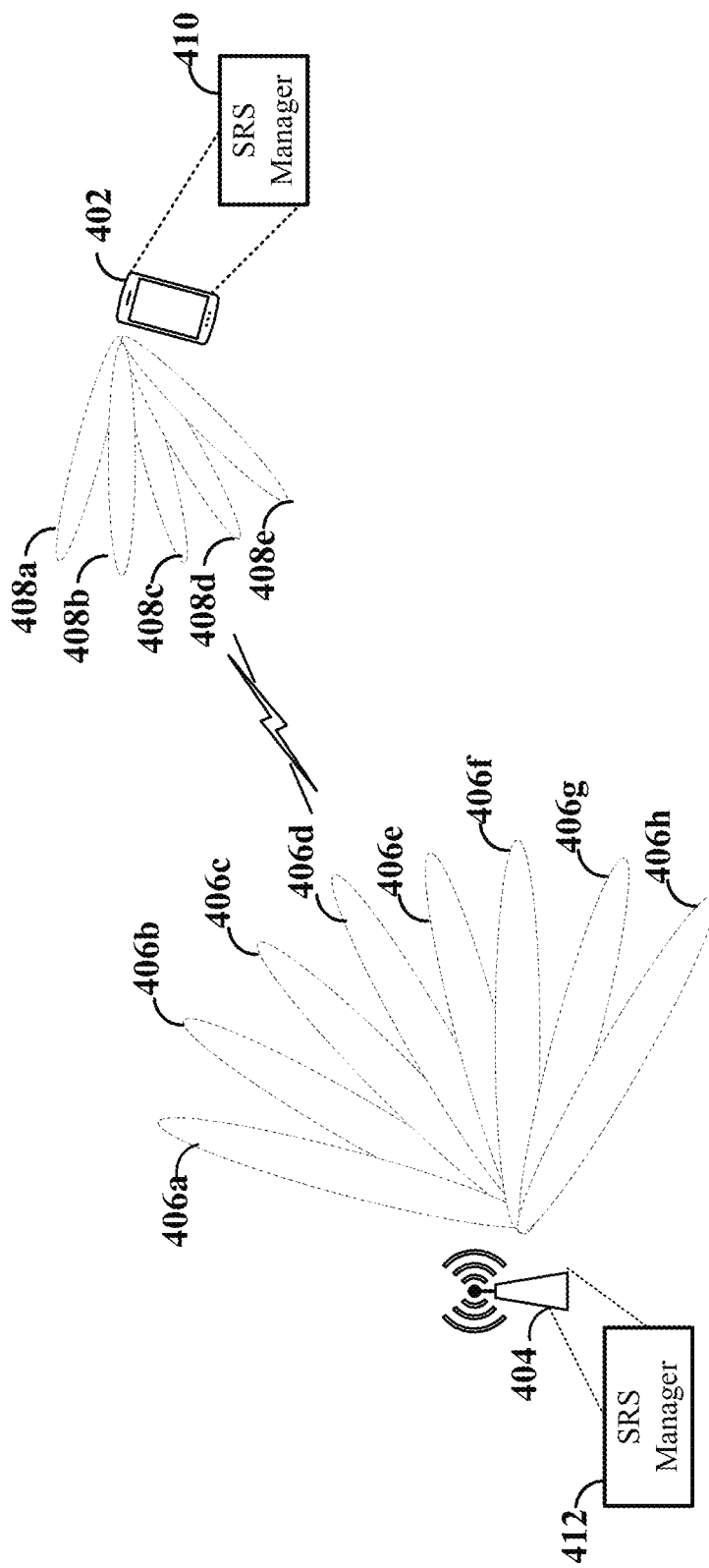
FIG. 4 is a diagram illustrating an example of communication between a base station and a UE using beamforming according to some aspects.

FIG. 4 is a diagram illustrating communication between a base station 404 and a UE 402 using beamformed signals according to some aspects. The base station 404 may be any of the base stations (e.g., gNBs) or scheduling entities illustrated in FIGS. 1 and/or 2, and the UE 402 may be any of the UEs or scheduled entities illustrated in FIGS. 1 and/or 2.

In the example shown in FIG. 4, the base station 404 is configured to generate a plurality of beams 406a-406h, each associated with a different beam direction. In addition, the UE 402 is configured to generate a plurality of beams 408a-408e, each associated with a different beam direction. The base station 404 and UE 402 may select one or more beams 406a-406h on the base station 404 and one or more beams 408a-408e on the UE 402 for communication of uplink and downlink signals therebetween using a downlink beam management scheme and/or an uplink beam management scheme.

In an example of a downlink beam management scheme for selection of downlink beams, the base station 404 may be configured to sweep or transmit on each of a plurality of downlink transmit beams 406a-406h during one or more synchronization slots. For example, the base station 404 may transmit a reference signal, such as an SSB or CSI-RS, on each beam in the different beam directions during the synchronization slot. Transmission of the beam reference signals may occur periodically (e.g., as configured via radio resource control (RRC) signaling by the gNB), semi-persistently (e.g., as configured via RRC signaling and activated/deactivated via medium access control-control element (MAC-CE) signaling by the gNB), or aperiodically (e.g., as triggered by the gNB via downlink control information (DCI)). It should be noted that while some beams are illustrated as adjacent to one another, such an arrangement may be different in different aspects. For example, downlink transmit beams 406a-406h transmitted during a same symbol may not be adjacent to one another. In some examples, the base station 404 may transmit more or less beams distributed in all directions (e.g., 360 degrees).

In addition, the UE 402 is configured to receive the downlink beam reference signals on a plurality of downlink receive beams 408a-408e. In some examples, the UE 402 searches for and identifies each of the downlink transmit beams 406a-406h based on the beam reference signals. The UE 402 then performs beam measurements (e.g., RSRP, SINR, RSRQ, etc.) on the beam reference signals on each of the downlink receive beams 408a-408e to determine the respective beam quality of each of the downlink transmit beams 406a-406h as measured on each of the downlink receive beams 408a-408e.

The UE 402 can generate and transmit an L1 measurement report, including the respective beam index (beam identifier (ID)) and beam measurement of one or more of the downlink transmit beam 406a-406h on one or more of the downlink receive beams 408a-408e to the base station 404. The base station 404 may then select one or more downlink transmit beams on which to transmit unicast downlink control information and/or user data traffic to the UE 402. In some examples, the selected downlink transmit beam(s) have the highest gain from the beam measurement report. In some examples, the UE 402 can further identify the downlink transmit beams selected by the base station from the beam measurements. Transmission of the beam measurement report may occur periodically (e.g., as configured via RRC signaling by the gNB), semi-persistently (e.g., as configured via RRC signaling and activated/deactivated via MAC-CE signaling by the gNB), or aperiodically (e.g., as triggered by the gNB via DCI).

The base station 404 or the UE 402 may further select a corresponding downlink receive beam on the UE 402 for each selected serving downlink transmit beam to form a respective downlink beam pair link (BPL) for each selected serving downlink transmit beam. For example, the UE 402 can utilize the beam measurements to select the corresponding downlink receive beam for each serving downlink transmit beam. In some examples, the selected downlink receive beam to pair with a particular downlink transmit beam may have the highest gain for that particular downlink transmit beam.

In one example, a single downlink transmit beam (e.g., beam 406d) on the base station 404 and a single downlink receive beam (e.g., beam 408c) on the UE may form a single downlink BPL used for communication between the base station 404 and the UE 402. In another example, multiple downlink transmit beams (e.g., beams 406c, 406d, and 406e) on the base station 404 and a single downlink receive beam (e.g., beam 408c) on the UE 402 may form respective downlink BPLs used for communication between the base station 404 and the UE 402. In another example, multiple downlink transmit beams (e.g., beams 406c, 406d, and 406e) on the base station 404 and multiple downlink receive beams (e.g., beams 408c and 408d) on the UE 402 may form multiple downlink BPLs used for communication between the base station 404 and the UE 402. In this example, a first downlink BPL may include downlink transmit beam 406c and downlink receive beam 408c, a second downlink BPL may include downlink transmit beam 408d and downlink receive beam 408c, and a third downlink BPL may include downlink transmit beam 408e and downlink receive beam 408d.

When the channel is reciprocal, the above-described downlink beam management scheme may also be used to select one or more uplink BPLs for uplink communication from the UE 402 to the base station 404. For example, the downlink BPL formed of beams 406d and 408e may also serve as an uplink BPL. Here, beam 408c is utilized as an uplink transmit beam, while beam 406d is utilized as an uplink receive beam.

In an example of an uplink beam management scheme, the UE 402 may be configured to sweep or transmit on each of a plurality of uplink transmit beams 408a-408e. For example, the UE 402 may transmit an SRS on each beam in the different beam directions. In addition, the base station 404 may be configured to receive the uplink beam reference signals on a plurality of uplink receive beams 406a-406h. In some examples, the base station 404 searches for and identifies each of the uplink transmit beams 408a-408e based on the beam reference signals. The base station 404 then performs beam measurements (e.g., RSRP, SINR, RSRQ, etc.) on the beam reference signals on each of the uplink receive beams 406a-406h to determine the respective beam quality of each of the uplink transmit beams 408a-408e as measured on each of the uplink receive beams 406a-406h.

The base station 404 may then select one or more uplink transmit beams on which the UE 402 will transmit unicast downlink control information and/or user data traffic to the base station 404. In some examples, the selected uplink transmit beam(s) have the highest gain. The base station 404 may further select a corresponding uplink receive beam on the base station 404 for each selected serving uplink transmit beam to form a respective uplink beam pair link (BPL) for each selected serving uplink transmit beam. For example, the base station 404 can utilize the uplink beam measurements to select the corresponding uplink receive beam for each serving uplink transmit beam. In some examples, the selected uplink receive beam to pair with a particular uplink transmit beam may have the highest gain for that particular uplink transmit beam.

The base station 404 may then notify the UE 402 of the selected uplink transmit beams. For example, the base station 404 may provide the SRS resource identifiers (SRIs) identifying the SRSs transmitted on the selected uplink transmit beams. In some examples, the base station 404 may apply each selected uplink transmit beam (and corresponding uplink receive beam) to an uplink signal (e.g., PUCCH, PUSCH, etc.) and transmit the respective SRIs associated with the selected uplink transmit beams applied to each uplink signal to the UE 402. When the channel is reciprocal, the above-described uplink beam management scheme may also be used to select one or more downlink BPLs for downlink communication from the base station 404 to the UE 402. For example, the uplink BPLs may also be utilized as downlink BPLs.

To facilitate transmission of SRSs using uplink beams from the UE 402 to the base station 404, each of the UE 402 and base station 406 may include a respective SRS manager 410 and 412, respectively, configured to utilize an SRS configuration for an SRS resource set including SRS resources associated with multiple TRPs (e.g., the base station 404 and at least one other base station or TRP). For example, the SRS manager 412 may be configured to generate the SRS configuration and provide the SRS configuration to the UE 402. In addition, the SRS manager 410 may be configured to utilize the SRS configuration to generate a plurality of SRSs for transmission towards the base station 404 and at least one other base station or TRP.

In some examples, the SRS manager 410 may be configured to transmit an SRS resource based on a quasi co-located (QCL'ed) association with another reference signal, such as an SSB, CSI-RS, or another SRS, as indicated in the SRS configuration. For example, the SRS configuration may indicate a QCL association between an SRS resource and a particular SSB beam, CSI-RS beam, or SRS beam. As an example, the SRS resource may have a QCL association with beam 406d, which may be, for example, a CSI-RS beam. Thus, based on the QCL association (e.g., with CSI-RS beam 406d), the SRS manager 410 may transmit an SRS with the same spatial domain filter utilized for reception of the indicated reference signal (e.g., CSI-RS beam 406d). In an example, the SRS manager 410 may transmit the SRS on beam 408c based on the QCL association with CSI-RS beam 406d.

Figures 5A, 5B:
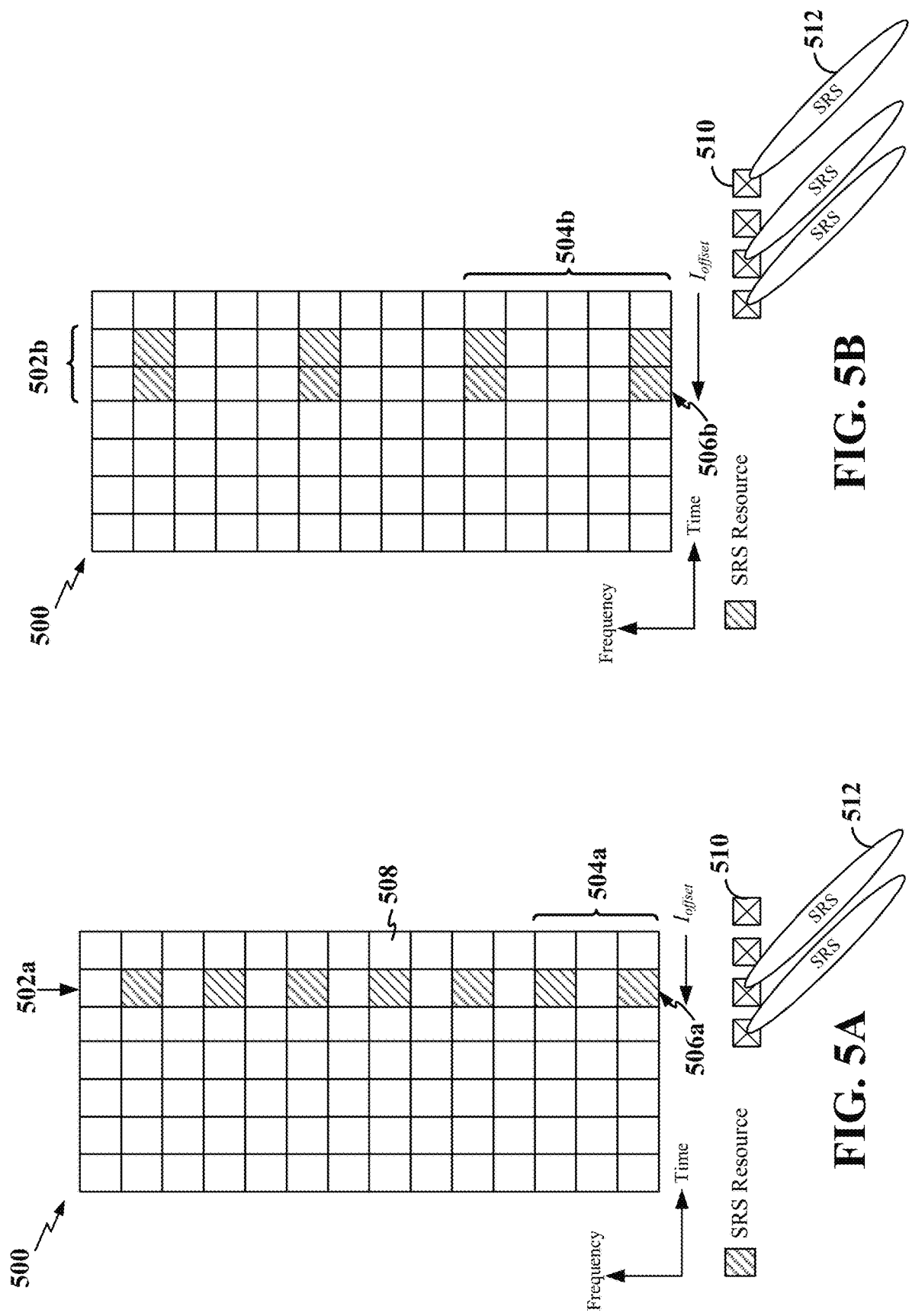
FIGS. 5A and 5B are diagrams illustrating examples of sounding reference signal (SRS) resources according to some aspects.

FIGS. 5A and 5B are diagrams illustrating examples of sounding reference signal (SRS) resources 502a and 502b according to some aspects. The SRS resources 502a and 502b are illustrated as being located within a portion of a resource grid 500 including a plurality of REs 508. In the time domain, an SRS resource can include a number of consecutive OFDM symbols $N_{symb}$ selected from the set consisting of {1, 2, 4}. Thus, an SRS resource can occupy 1, 2, or 4 OFDM symbols. In the example shown in FIG. 5A, the SRS resource 502a includes one OFDM symbol, while in the example shown in FIG. 5B, the SRS resource 502b includes two OFDM symbols. In addition, an SRS resource may be located within the last six symbols of a slot. Thus, the starting symbol of an SRS resource may be designated as a number of symbols offset from the last symbol of the slot. For example, the starting symbol $I_{offset}$ may be selected from the set consisting of {0, 1, 2, 3, 4, 5}. In the example shown in FIG. 5A, the starting symbol 506a may be indicated as $I_{offset}=1$, while in the example shown in FIG. 5B, the starting symbol 506b may be indicates as $I_{offset}=3$.

In the frequency domain, each SRS resource 502a and 502b may occupy a number of RBs $m_{SRS}$. In some examples, the number of RBs may be between $1 \leq m_{SRS} \leq 272$. In addition, each SRS resource 502a and 502b may have a transmission comb structure $k_{TC}$, such that the SRS is transmitted every Nth subcarrier, where N=2 or 4. Thus, the transmission comb structure $k_{TC}$ may be selected from the set consisting of {2, 4}. In the example shown in FIG. 5A, the SRS resource 502a has a transmission comb structure 504a of two, while in the example shown in FIG. 5B, the SRS resource 502b has a transmission comb structure 504b of four. In some examples, an SRS resource (e.g., SRS resource 502b) occupying more than one symbol may be used to transmit a single SRS or one or more repetitions of the SRS.

In addition, each SRS resource 502a and 502b may include up to four antenna ports 510 that may be interleaved, for example, in the frequency domain. In the example shown in FIGS. 5A and 5B, a plurality of antenna ports 510 are illustrated, each for communicating on a respective beam 512. Thus, in the examples shown in FIGS. 5A and 5B, each antenna port 510 refers to a logical port (e.g., a beam 512) over which an SRS may be transmitted. In an example, a UE may include an antenna array having a plurality of antenna elements that may be mapped to the antenna ports 510 via a combiner. The number of antenna ports 510 shown in FIGS. 5A and 5B is merely exemplary, and the present disclosure is not limited to any number of antenna ports. As shown in FIG. 5A, the SRS resource 502a includes two of the antenna ports 510, each associated with transmission of the SRS on a respective beam 512. In addition, as shown in FIG. 5B, the SRS resource 504b includes three of the antenna ports 510, each associated with transmission of the SRS on a respective beam 512.

Figures 6A, 6B, 6C:
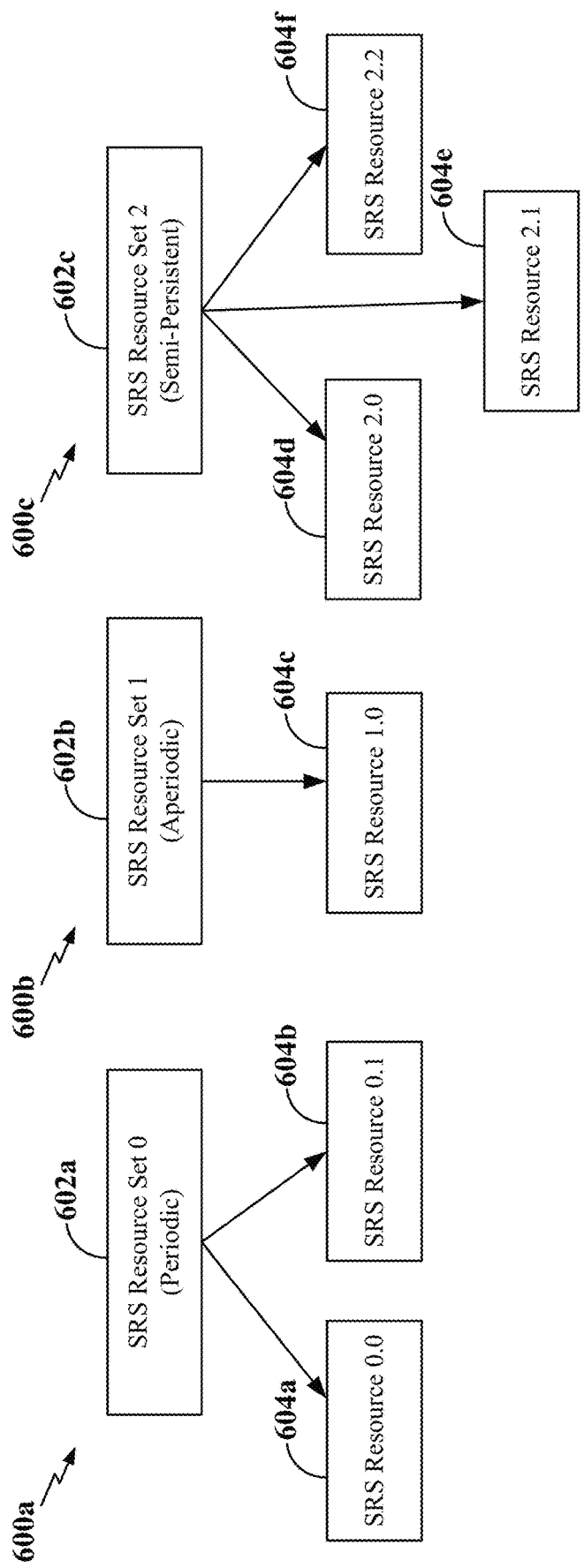
FIGS. 6A, 6B, and 6C are diagrams illustrating exemplary SRS resource sets, each including SRS resources according to some aspects.

FIGS. 6A, 6B, and 6C are diagrams illustrating exemplary SRS configurations 600a-600c for SRS resource sets 602a-602c, each including SRS resources 604a-604f according to some aspects. An SRS resource set may include one or more SRS resources. For example, SRS resource set 602a (SRS Resource Set 0) includes SRS resources 604a and 604b (SRS Resource 0.0 and SRS Resource 0.1), SRS resource set 602b (SRS Resource Set 1) includes SRS resource 604c (SRS Resource 1.0), and SRS resource set 602c (SRS Resource Set 2) includes SRS resources 604d, 604e, and 604f (SRS Resource 2.0, SRS Resource 2.1, and SRS Resource 2.2).

As indicated in FIGS. 6A-6C, multiple SRS resource sets 602a-602c may be configured for a UE. In addition, each SRS resource set 602a-602c may be configured to be periodic, aperiodic, or semi-persistent, such that each of the SRS resources within the corresponding SRS resource set are periodic, aperiodic, or semi-persistent, respectively. For example, the SRS resources 604a and 604b within SRS resource set 602a may be periodic SRS resources, the SRS resource 604c within SRS resource set 602b may be aperiodic SRS resources, and the SRS resources 604d-604f within SRS resource set 602c may be semi-persistent SRS resources.

Each SRS resource 604a-604f includes a set of SRS resource parameters configuring the SRS resource. For example, the SRS resource parameters may include a set of port(s) (e.g., uplink beam), number of consecutive symbols ($N_{symb}$), time domain allocation ($I_{offset}$), repetition, transmission comb structure ($k_{TC}$), bandwidth ($m_{SRS}$), and other suitable parameters. Each SRS may further be quasi co-located (QCL'ed) with another reference signal, such as an SSB, CSI-RS, or another SRS. Thus, based on the QCL association (e.g., with an SSB beam, CSI-RS beam, or SRS beam), the SRS resource may be transmitted with the same spatial domain filter utilized for reception/transmission of the indicated reference signal (e.g., SSB beam, CSI-RS beam, or SRS beam).

The respective sets of SRS resource parameters for each of the SRS resources in a particular SRS resource set collectively form the SRS resource set parameters for the SRS resource set. In addition, the SRS resource set itself may further include additional SRS resource set parameters. For example, the SRS resource set parameters for the aperiodic SRS resource set 602b may further include an aperiodic trigger state (e.g., codepoint) for the aperiodic SRS resource set 602b (e.g., up to three trigger states may be possible, each mapping to an aperiodic SRS resource set), a slot offset between the slot including the DCI triggering the aperiodic SRS resource and transmission of the SRS (e.g., SRS is transmitted k slot(s) after the slot carrying the DCI containing the trigger state), and a CSI-RS resource identifier (CRI) associated with the aperiodic SRS resource set 602b for precoder estimation of the aperiodic SRSs. As another example, the SRS configuration for a periodic SRS resource set 602a or semi-persistent SRS resource set 602c may indicate the periodicity of the SRS resources (e.g., the periodicity of transmission of SRSs). The respective SRS resource set parameters then collectively form the SRS configuration 600a-600c of the corresponding SRS resource set 602a-602c.

A radio access network (RAN) entity (e.g., base station, which may be a TRP or include multiple TRPs in a RRH configuration) may semi-statically configure a UE with one or more SRS resource sets 602a-602c via, for example, radio resource control (RRC) signaling. In some examples, the RAN entity may transmit an RRC message including an RRC configuration (e.g., RRC configuration information element (IE)) indicating the SRS configuration of a particular SRS resource set.

For example, the RAN entity may semi-statically configure the UE with one or more periodic SRS resource sets 602a that the UE may utilize to generate and transmit periodic SRSs to the RAN entity. As another example, the RAN entity may semi-statically configure the UE with one or more aperiodic SRS resource sets 602b and corresponding trigger states. The RAN entity may then trigger an aperiodic SRS resource set 602b using DCI. As another example, the RAN entity may semi-statically configure the UE with one or more semi-persistent SRS resource sets 602c. The RAN entity may then activate or deactivate a semi-persistent SRS resource set 602c using a medium access control (MAC) control element (MAC-CE).

Figure 7B:
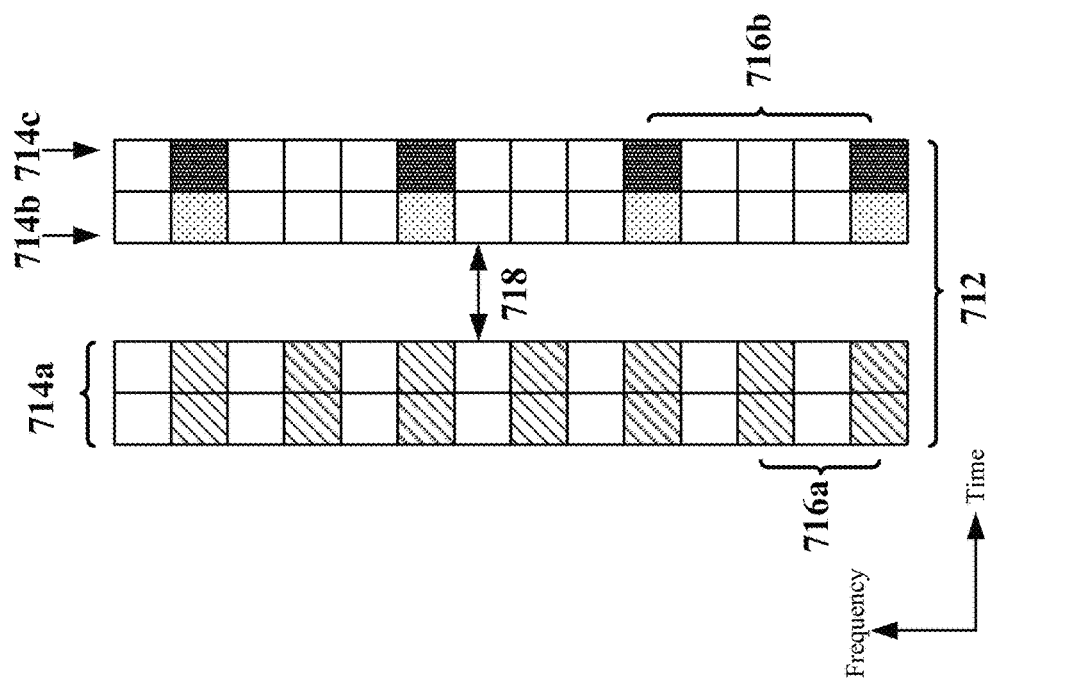
FIG. 7B is a diagram illustrating an example of a multi-TRP SRS resource set according to some aspects.
Figure 7A:
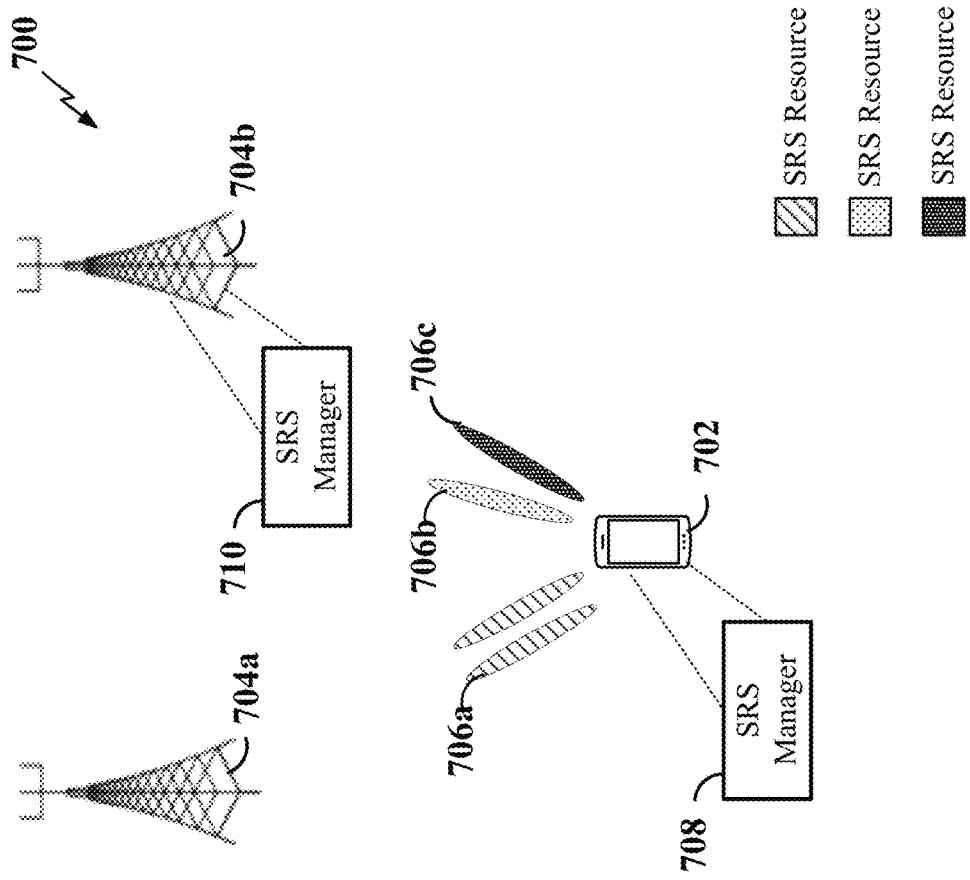
FIG. 7A is a diagram illustrating a wireless communication network including multiple transmission and reception points (TRPs) in wireless communication with a UE according to some aspects.

FIG. 7A is a diagram illustrating a wireless communication network 700 including multiple transmission and reception points (TRPs) 704a and 704b in wireless communication with a UE 702 according to some aspects. Each TRP 704a and 704b may be, for example, a base station (e.g., gNB) or a remote radio head (RRH) of a base station. In some examples, the TRPs 704a and 704b may belong to the same cell (e.g., have the same physical cell identifier (PCI)) or to different cells (e.g., each have a different respective PCI). For example, each TRP 704a and 704b may correspond to any of the base stations, RRHs, or scheduling entities shown in FIGS. 1, 3, and/or 4. The UE 702 may correspond to any of the UEs or scheduled entities shown in FIGS. 1, 3, and/or 4. In some examples, the UE 702 may be a high-end UE, low-end UE or reduced-capability UE.

Fifth generation (5G) wireless communication networks, such as the New Radio (NR) wireless communication network, support communication between a base station and high-end UEs for a plurality of different usage cases, including, for example, enhanced mobile broadband (eMBB) and ultra-reliable and low latency communication (URLLC). NR networks may further support communication between a base station and low-end UEs in massive machine-type communication (mMTC) usage cases. In some examples, LTE-M or Narrowband Internet of Things (NB-IoT) technology may be utilized to meet the requirements of mMTC.

In addition to providing services to high-end UEs (e.g., via eMMB and/or URLLC) and low-end UEs (e.g., via mMTC), NR networks may further provide services to reduced capability UEs. The service requirements for reduced capability UEs may be less than high-end UEs, but greater than low-end UEs. For example, use cases for reduced capability UEs may include not only URLLC services with high requirements, but also low-end services to accommodate smaller form factors and longer battery lives. Examples of reduced-capability UEs may include, but are not limited to, industrial wireless sensors, surveillance cameras, and wearable devices (e.g., smart watches, rings, eHealth related devices, and medical monitoring devices). In general, reduced capability UEs have a device design with a compact form factor and reduced complexity as compared to high-end UEs. For example, reduced capability UEs may have a reduced number of transmit/receive antennas, reduced device bandwidth (e.g., reduced operating bandwidth of the UE), relaxed processing time, and/or relaxed processing capability. Reduced capability UEs may further be configured for power saving and battery lifetime enhancement in delay tolerant use cases.

The UE 702 and TRPs 704a and 704b may further be configured to communicate beamformed signals therebetween using, for example, a mmWave carrier. To facilitate selection of one or more uplink beams for communication of uplink signals from the UE 702 to at least one of the TRPs 704a and 704b, the UE 702 may transmit SRSs to each of the TRPs 704a and 704b for measurement thereof. For example, based on the SRS measurements and feedback to the UE 702, the UE 702 may transmit subsequent uplink signals to a selected TRP (e.g., TRP 704a) on a selected uplink beam.

Transmission of SRSs to multiple TRPs 704a and 704b may be utilized, for example, if the UE 702 is a stationary reduced-capability, where TRP spatial diversity may help mitigate against channel/path blockages or temporary shadowing (e.g., a temporary obstruction) of one TRP (e.g., TRP 704b). In addition, in cases where the UE 702 is stationary and rotating (e.g., the UE is a video surveillance camera), the UE 702 may be exposed to the coverage of the multiple TRPs 704a and 704b while rotating and the UE may perform selection of uplink beams among the TRPs 704a and 704b. Furthermore, if the UE 702 is configured for Layer 1 (L1)-based cell mobility where L1 messages instead of RRC messages are used for handover between TRPs 704a and 704b belonging to the same gNB, the UE may obtain SRS measurements from multiple TRPs 704a and 704b for handover and beam selection.

In some examples, the UE 702 may be configured with separate SRS resource sets for each of the TRPs 704a and 704b. In this example, to collect SRS measurements on both TRPs 704a and 704b, the UE 702 may transmit a first set of SRSs to TRP 704a using a first SRS resource set configured for TRP 704a and then subsequently transmit a second set of SRSs to TRP 704b using a second, different SRS resource set configured for TRP 704b. Using two separate SRS resource sets, one for each TRP 704a and 704b, delays SRS measurements and increases resource usage.

Therefore, in various aspects of the disclosure, a single SRS resource set may be configured for multiple TRPs 704a and 704b. The SRS resource set may include one or more SRS resources for each TRP 704a and 704b. Thus, SRS measurements may be obtained by both TRPs 704a and 704b in one shot (e.g., one SRS beam sweep). In some examples, at least one of the TRPs (e.g., TRP 704b, as shown in FIG. 7A), or a gNB associated with the TRP(s), may include an SRS manager 710 for configuring a multi-TRP SRS resource set including SRS resources associated with each of the TRPs 704a and 704b. The TRP 704b (or TRP 704a) may then transmit an SRS configuration of the multi-TRP SRS resource set to the UE 702 via, for example, RRC signaling. In addition, the UE 702 may further include an SRS manager 708 configured to use the SRS configuration to generate and transmit a plurality of SRSs on a plurality of uplink beams 706a, 706b, and 706c to the multiple TRPs 704a and 704b. For example, each of the TRPs 704a and 704b may receive at least one of the SRSs transmitted by the UE 702 in accordance with the SRS configuration.

FIG. 7B is a diagram illustrating an example of a multi-TRP SRS resource set 712 according to some aspects. FIG. 7B will be described in connection with the diagram shown in FIG. 7A. The multi-TRP SRS resource set 712 includes SRS resources 714a, 714b, and 714c associated with multiple TRPs 704a and 704b. SRS resource 714a may be configured for TRP 704a, while SRS resources 714b and 714c may be configured for TRP 704b. SRS resources 714a, 714b, and 714c may each be associated with different beam directions (e.g., different uplink beams). For example, as shown in FIG. 7A, SRS resource 714a may be transmitted on beam 706a, SRS resource 714b may be transmitted on beam 706b, and SRS resource 714c may be transmitted on beam 706c.

In the example shown in FIG. 7B, SRS resource 714a includes a transmission comb structure 716a of two subcarriers (e.g., $k_{TC}=2$) and two symbols, where the second symbol is a repetition of the first symbol. Thus, as shown in FIG. 7A, SRS resource 714a is repeated on beam 706a (e.g., the same SRS is transmitted on beam 706a within two consecutive symbols). In addition, SRS resources 714b and 714c each include a transmission comb structure 716b of four subcarriers (e.g., $k_{TC}=4$) and a single symbol. Thus, as shown in FIG. 7A, different SRSs, each corresponding to one of the SRS resources 714b and 714c, are transmitted on beams 706b and 706c, respectively.

In some examples, the starting symbol of SRS resource 714c may be configured with an offset of zero symbols (e.g., $I_{offset}=0$), the starting symbol of SRS resource 714b may be configured with an offset of one symbol (e.g., $I_{offset}=1$), and the starting symbol of SRS resource 714a may be configured with an offset of more than two symbols (e.g., $I_{offset}>2$). In some examples, SRS resource 714a may be configured with an offset of three symbols (e.g., $I_{offset}=3$) to enable the SRS resources 714a, 714b, and 714c to be located within consecutive symbols of a slot. In other examples, SRS resource 714a may be configured with an offset of more than three symbols (e.g., $I_{offset}>3$) to provide a gap length 718 between SRS resource 714a and SRS resource 714b. The gap length 718 may include, for example, one or two symbols.

A gap length 718 may be configured, for example, when TRP 704a and TRP 704b belong to different respective timing advance groups (TAGs). In this example, the gap length 718 between the respective SRS resources 714a and 714b/714c associated with each of the TRPs 704a and 704b, respectively, may be provided to accommodate the different timing advances to be applied to the SRS resources 714a and 714b as a result of the different TAGs. In some examples, the gap length 718 may be configured as part of the SRS resource configuration (e.g., by setting $I_{offset}$ for SRS resource 714a to accommodate the timing advance difference). For example, the gap length 718 may be set to accommodate a maximum timing advance difference that may occur between the TAGs. In other examples, the gap length 718 may be signaled separately to the UE 702 based on the different timing advance values between the TAGs or based on the maximum timing advance difference possible between the TAGs.

In other examples, the gap length 718 may be configured by the UE 702 based on a difference between a first timing advance command associated with a first TAG including the TRP 704a and a second timing advance command associated with a second TAG including the TRP 704b. The first timing advance command may indicate a first timing advance to be applied by the UE 702 to uplink signals transmitted to the TRPs (including TRP 704a) in the first TAG. The second timing advance command may indicate a second timing advance to be applied by the UE 702 to uplink signals transmitted to the TRPs (including TRP 704b) in the second TAG. Each timing advance command may be transmitted, for example, by a TRP within the corresponding TAG to the UE 702. It should be noted that when the TRPs 704a and 704b belong to the same TAG, the gap length 718 may be zero, such that the SRS resources 714a, 714b, and 714c are located on consecutive symbols within the slot.

In other examples, a gap length 718 may be configured when the QCL association for the SRS resource 714a associated with TRP 704a is different than the QCL association for the SRS resources 714b/714c associated with TRP 704b. For example, SRS resource 714a may include a first QCL association (e.g., with an SSB beam, CSI-RS beam, or SRS beam) and SRS resources 714b/714c may include a second QCL association (e.g., with a different SSB beam, CSI-RS beam, or SRS beam) that is different than the first QCL association. The gap length 718 may be configured to enable the UE 702 to switch the beam direction and spatial filter from the first QCL association to the second QCL association. In some examples, the gap length 718 may be determined based on a capability of the UE 702 (e.g., an amount of time it takes for the UE 702 to switch between QCL associations). For example, the UE 702 may provide the UE capability to a gNB (e.g., via one or more of the TRPs 704a and 704b) and receive a UE-specific gap length 718 from a TRP (e.g., TRP 704a or 704b) configured in accordance with the UE capability. In other examples, the gap length 718 may be a common gap length 718 configured for all UEs (e.g., by a gNB associated with TRPs 704a and 704b), and an indication of the common gap length 718 may be received from one of the TRPs 704a and 704b. For example, a pre-configured gap length 718 may be set to accommodate any UE capability.

It should be understood that in other configurations, the SRS resource set 712 may span multiple slots, and as such, the starting symbol for each of the SRS resources 714a, 714b, and 714c may be configured based on the particular slot associated with each SRS resource 714a, 714b, and 714c.

Figure 8:
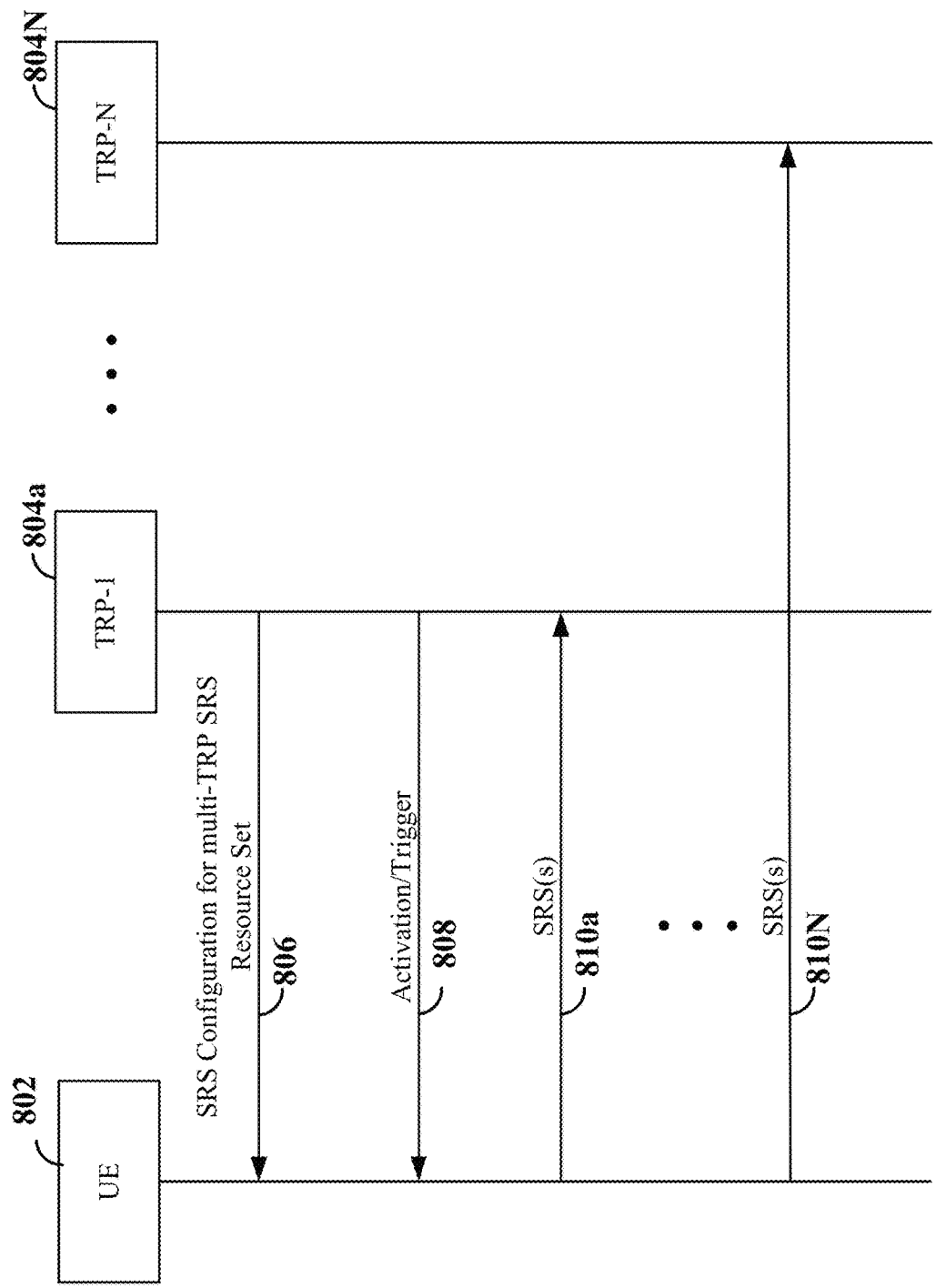
FIG. 8 is a signaling diagram illustrating an example of signaling between a UE and multiple TRPs utilizing a multi-TRP SRS resource set according to some aspects.

FIG. 8 is a signaling diagram illustrating an example of signaling between a UE 802 and multiple TRPs 804a . . . 804N utilizing a multi-TRP SRS resource set according to some aspects. The UE 802 may correspond to any of the UEs or scheduled entities shown in FIGS. 1, 3, 4, and/or 7. In addition, the TRPs (e.g., TRP-1 through TRP-N) may correspond to any of the base stations, TRPs, or scheduling entities shown in FIGS. 1, 3, 4, and/or 7. In some examples, the TRPs 804a . . . 804N may belong to the same cell or different cells (e.g., at least two of the TRPs may include a different respective PCI). In addition, the TRPs 804a . . . 804N may belong to the same TAG or to different TAGs (e.g., at least two of the TRPs may belong to different respective TAGs).

At 806, a TRP (e.g., TRP 804a) may transmit an SRS configuration for a multi-TRP SRS resource set to the UE 802. The multi-TRP SRS resource set may include a plurality of SRS resources associated with the multiple TRPs 804a . . . 804N. The multi-TRP SRS resource set may be, for example, an aperiodic SRS resource set, periodic SRS resource set, or semi-persistent SRS resource set. In some examples, a gap length may be configured between SRS resources within the multi-TRP SRS resource set that are associated with TRPs belonging to different TAGs or that have different QCL associations.

The SRS configuration may be configured, for example, by the TRP 804a in coordination with other TRPs or by a base station (e.g., gNB) associated with the TRPs 804a . . . 804N. In some examples, the SRS configuration may include a common set of SRS resource set parameters for the multiple TRPs 804a . . . 804N. For example, the SRS configuration may configure the multi-TRP SRS resource set including one or more SRS resources that each include the same (common) SRS resource parameters (e.g., transmission comb structure, port(s), number of symbols, repetition, etc.). In other examples, the SRS configuration may include a respective set of SRS resource set parameters for each of the multiple TRPs 804a . . . 804N. For example, the SRS configuration can include a plurality of TRP SRS configurations, each associated with a respective TRP, where each TRP SRS configuration includes different respective SRS resource parameters. Each TRP SRS configuration may configure one or more SRS resources associated with a particular TRP. Thus, each TRP SRS configuration includes the SRS resource set parameters configuring the particular SRS resources for that TRP.

As an example, the SRS configuration can include a first TRP SRS configuration that configures one or more SRS resources associated with TRP-1 and a second TRP SRS configuration that configures one or more different SRS resources having different SRS resource parameters associated with TRP-2. Thus, the SRS resource set parameters of the first TRP SRS configuration may be different than the SRS resource set parameters of the second TRP SRS configuration.

The SRS configuration may be provided to the UE 802 in a radio resource control (RRC) message. In some examples, the RRC message may include a single RRC configuration (e.g., a single RRC configuration information element (IE))

including the SRS configuration. For example, the RRC configuration may include a sequence of TRP SRS configurations. In examples in which the SRS configuration includes a common set of SRS resource set parameters, the sequence may have a length of one (e.g., a single TRP SRS configuration including common SRS resource set parameters). In other examples, the RRC message may include multiple RRC configurations (e.g., multiple RRC configuration IEs), each including one of the TRP SRS configurations.

At 808, the TRP 804a may optionally transmit an activation/trigger for the multi-TRP SRS resource set. For example, the TRP 804a may transmit DCI triggering an aperiodic multi-TRP SRS resource set or a MAC-CE activating a semi-persistent multi-TRP SRS resource set. In some examples, when the multi-TRP SRS resource set is an aperiodic SRS resource set, the TRP 804a may transmit DCI including a codepoint triggering the multi-TRP SRS resource set. The codepoint may, for example, trigger the SRS configuration when the SRS configuration included a single RRC configuration (e.g., a single TRP SRS configuration). In examples in which the SRS configuration included a plurality of RRC configurations (e.g., a plurality of TRP SRS configurations), the codepoint may trigger the plurality of TRP SRS configurations.

At 810a . . . 810N, the UE 802 may transmit a plurality of SRSs to the TRPs 804a . . . 804N in accordance with the SRS configuration. For example, the UE 802 may transmit one or more SRSs to each TRP 804a . . . 804N corresponding to the number of SRS resources configured for each TRP 804a . . . 804N. In some examples, when using a common set of SRS resource set parameters, each SRS resource in the SRS resource set may be associated with all of the TRPs. For example, each TRP 804a . . . 804N may receive all of the SRS(s) configured in the SRS resource set. In other examples, each SRS resource in the SRS resource set may be associated with a particular TRP.

Figure 9:
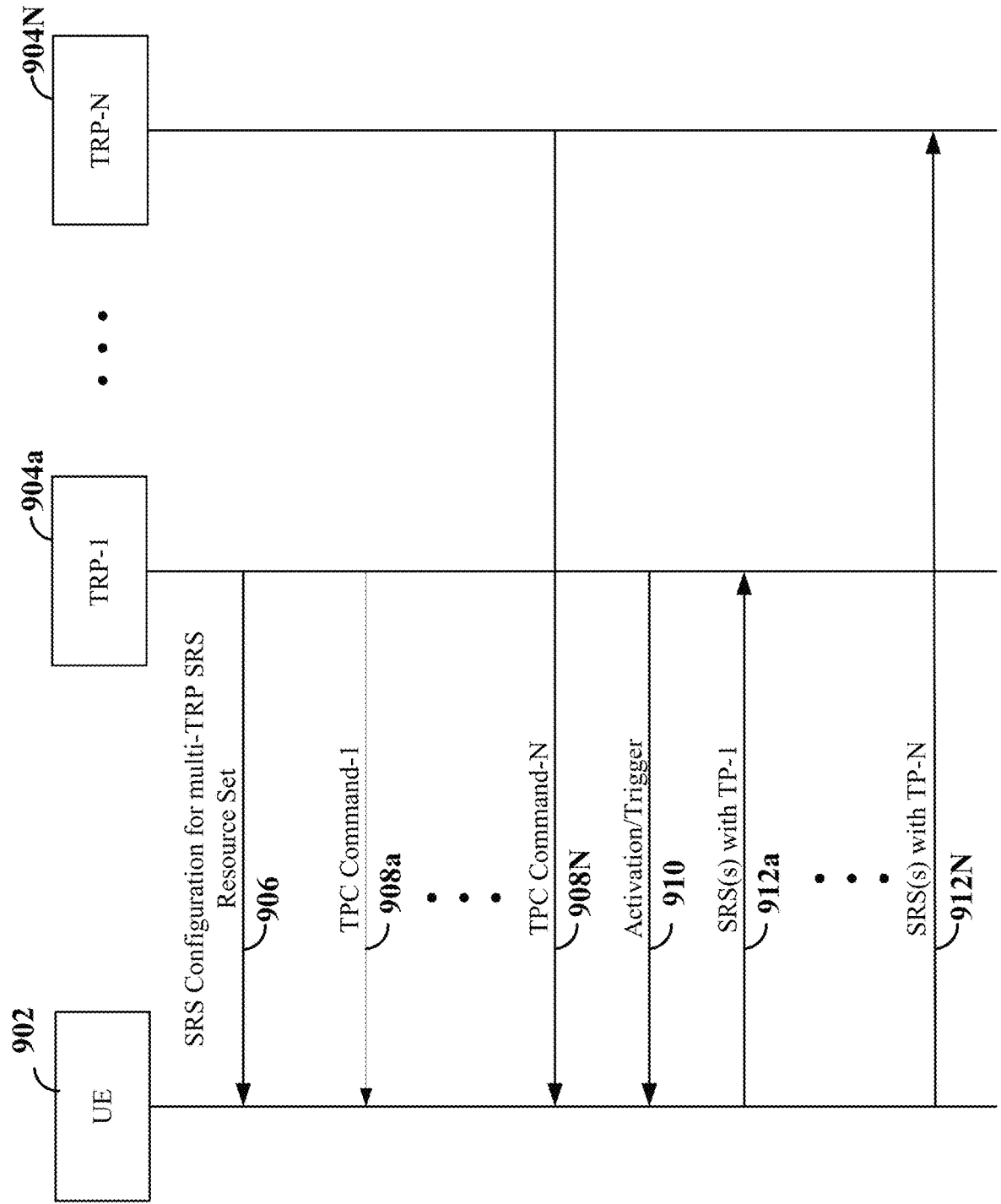
FIG. 9 is a signaling diagram illustrating an example of signaling between a UE and multiple TRPs for power control of SRS resources according to some aspects.

FIG. 9 is a signaling diagram illustrating an example of signaling between a UE 902 and multiple TRPs 904a . . . 904N for power control of SRS resources according to some aspects. The UE 902 may correspond to any of the UEs or scheduled entities shown in FIGS. 1, 3, 4, 7 and/or 8. In addition, the TRPs (e.g., TRP-1 through TRP-N) may correspond to any of the base stations, TRPs, or scheduling entities shown in FIGS. 1, 3, 4, 7 and/or 8. In some examples, the TRPs 904a . . . 904N may belong to the same cell or different cells. In addition, the TRPs 904a . . . 904N may belong to the same TAG or to different TAGs.

At 906, a TRP (e.g., TRP 904a) may transmit an SRS configuration for a multi-TRP SRS resource set to the UE 902. The multi-TRP SRS resource set may include a plurality of SRS resources associated with the TRPs 904a . . . 904N. The multi-TRP SRS resource set may be, for example, an aperiodic SRS resource set, periodic SRS resource set, or semi-persistent SRS resource set. In some examples, a gap length may be configured between SRS resources within the multi-TRP SRS resource set that are associated with TRPs belonging to different TAGs or that have different QCL associations. In some examples, the SRS configuration may include a common set of SRS resource set parameters for the TRPs 904a . . . 904N. In other examples, the SRS configuration may include a respective set of SRS resource set parameters for each of the TRPs 904a . . . 904N. In some examples, the SRS configuration may be provided to the UE 902 in a RRC message. In some examples, the RRC message may include a single RRC configuration (e.g., a single RRC configuration IE) including the SRS configuration. In other examples, the RRC message may include multiple RRC configurations (e.g., multiple RRC configuration IEs), each including a TRP SRS configuration associated with one of the TRPs 904a . . . 904N.

At 908a . . . 908N, the TRPs 904a . . . 904N may transmit a respective transmit power control (TPC) command (TPC-1 . . . TPC-N) to the UE 902. In some examples, the TPC commands may be closed-loop TPC commands for use in determining a transmit power of a physical uplink control channel (PUSCH) transmitted to the respective TRP 904a . . . 904N. In other examples, the TPC commands may be closed-loop TPC commands for use in determining a transmit power of SRSs transmitted to the respective TRP 904a . . . 904N. For example, the TPC commands may be included in DCI format 2_3.

At 910, the TRP 904a may optionally transmit an activation/trigger for the multi-TRP SRS resource set. For example, the TRP 904a may transmit DCI triggering an aperiodic multi-TRP SRS resource set or a MAC-CE activating a semi-persistent multi-TRP SRS resource set. In some examples, when the multi-TRP SRS resource set is an aperiodic SRS resource set, the TRP 904a may transmit DCI including a codepoint triggering the multi-TRP SRS resource set. The codepoint may, for example, trigger the SRS configuration when the SRS configuration included a single RRC configuration (e.g., a single TRP SRS configuration). In examples in which the SRS configuration included a plurality of RRC configurations (e.g., a plurality of TRP SRS configurations), the codepoint may trigger the plurality of TRP SRS configurations.

At 912a . . . 912N, the UE 902 may transmit one or more SRSs to the TRPs 904a . . . 904N utilizing a respective transmit power (TP-1 . . . TP-N) based on the corresponding TPC command (TPC-1 . . . TPC-N) in accordance with the SRS configuration. For example, the UE 902 may transmit one or more SRSs to TRP 904a utilizing a first transmit power (TP-1) based on TPC-1. In addition, the UE 902 may transmit one or more SRSs to TRP 904N utilizing an Nth transmit power (TP-N) based on TPC-N.

Figure 10:
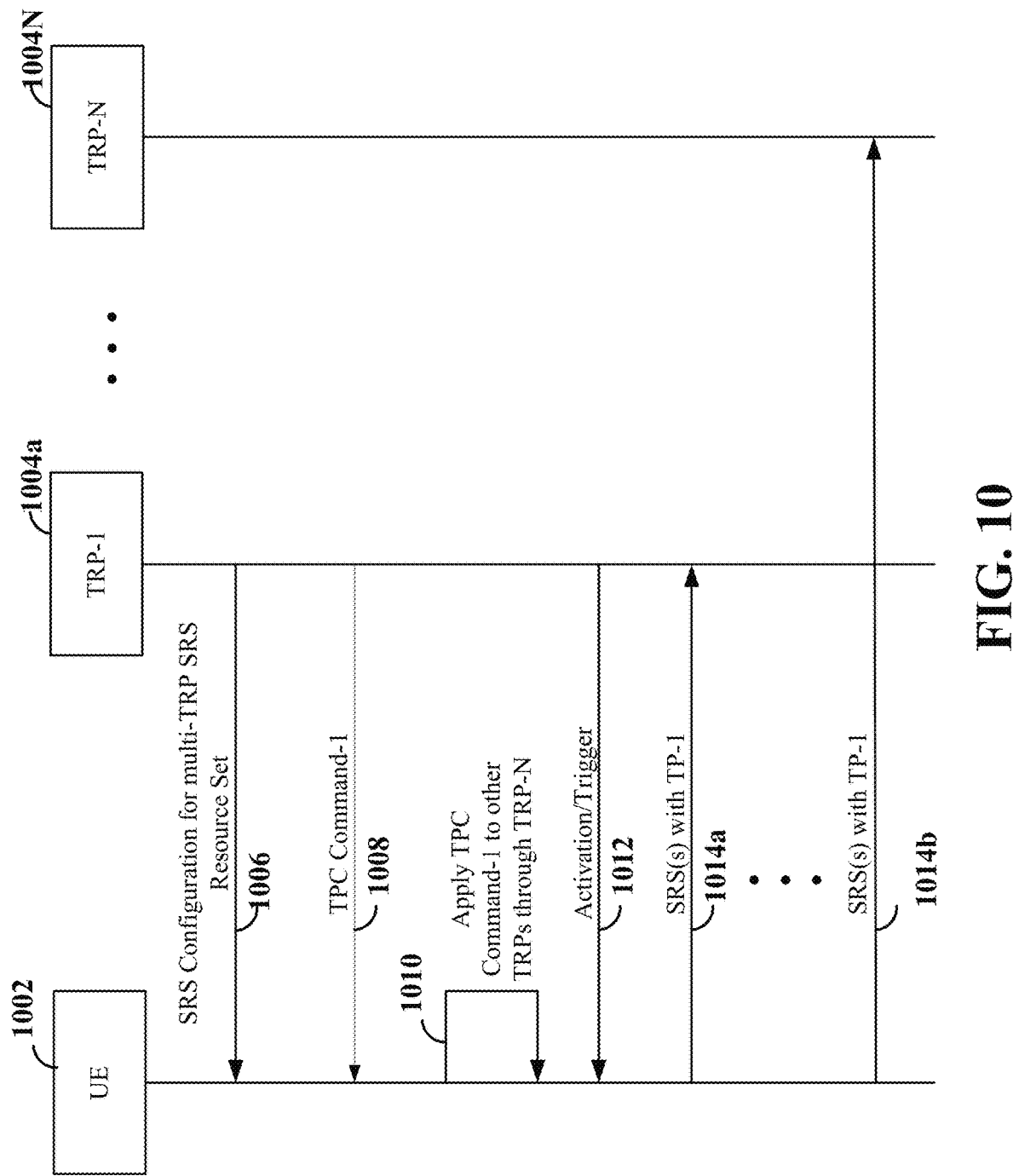
FIG. 10 is a signaling diagram illustrating another example of signaling between a UE and multiple TRPs for power control of SRS resources according to some aspects.

FIG. 10 is a signaling diagram illustrating another example of signaling between a UE 1002 and multiple TRPs 1004a . . . 1004N for power control of SRS resources according to some aspects. The UE 1002 may correspond to any of the UEs or scheduled entities shown in FIGS. 1, 3, 4, and/or 7-9. In addition, the TRPs (e.g., TRP-1 through TRP-N) may correspond to any of the base stations, TRPs, or scheduling entities shown in FIGS. 1, 3, 4, and/or 7-9. In some examples, the TRPs 1004a . . . 1004N may belong to the same cell or different cells. In addition, the TRPs 1004a . . . 1004N may belong to the same TAG or to different TAGs.

At 1006, a TRP (e.g., TRP 1004a) may transmit an SRS configuration for a multi-TRP SRS resource set to the UE 1002. The multi-TRP SRS resource set may include a plurality of SRS resources associated with the TRPs 1004a . . . 1004N. The multi-TRP SRS resource set may be, for example, an aperiodic SRS resource set, periodic SRS resource set, or semi-persistent SRS resource set. In some examples, a gap length may be configured between SRS resources within the multi-TRP SRS resource set that are associated with TRPs belonging to different TAGs or that have different QCL associations. In some examples, the SRS configuration may include a common set of SRS resource set parameters for the TRPs 1004a . . . 1004N. In other examples, the SRS configuration may include a respective set of SRS resource set parameters for each of the TRPs 1004a . . . 1004N. In some examples, the SRS configuration may be provided to the UE 1002 in a RRC message. In some examples, the RRC message may include a single RRC configuration (e.g., a single RRC configuration IE) including the SRS configuration. In other examples, the RRC message may include multiple RRC configurations (e.g., multiple RRC configuration IEs), each including a TRP SRS configuration associated with one of the TRPs 1004a . . . 1004N.

At 1008, the TRP 1004a may transmit a transmit power control (TPC) command (TPC-1) to the UE 1002. In some examples, the TPC command may be a closed-loop TPC command for use in determining a transmit power of a physical uplink control channel (PUSCH) transmitted to the TRP 1004a. In other examples, the TPC command may be a closed-loop TPC command for use in determining a transmit power of SRSs transmitted to the TRP 1004. For example, the TPC command may be included in DCI format 2_3.

At 1010, the UE 1002 may apply the TPC command to each of the other TRPs (e.g., through TRP 1004N). For example, the SRS resources configured in the multi-TRP SRS resource set may include a first set of SRS resources associated with the TRP 1004a and a second set of SRS resources associated with the TRP 1004N. The UE 1002 may apply the TPC command received for the first set of SRS resources to the second set of SRS resources.

At 1012, the TRP 1004a may optionally transmit an activation/trigger for the multi-TRP SRS resource set. For example, the TRP 1004a may transmit DCI triggering an aperiodic multi-TRP SRS resource set or a MAC-CE activating a semi-persistent multi-TRP SRS resource set. In some examples, when the multi-TRP SRS resource set is an aperiodic SRS resource set, the TRP 1004a may transmit DCI including a codepoint triggering the multi-TRP SRS resource set. The codepoint may, for example, trigger the SRS configuration when the SRS configuration included a single RRC configuration (e.g., a single TRP SRS configuration). In examples in which the SRS configuration included a plurality of RRC configurations (e.g., a plurality of TRP SRS configurations), the codepoint may trigger the plurality of TRP SRS configurations.

At 1014a . . . 1014N, the UE 1002 may transmit one or more SRSs to the TRPs 1004a . . . 1004N utilizing a transmit power (TP-1) based on the TPC command (TPC-1) in accordance with the SRS configuration. For example, the UE 1002 may transmit one or more SRSs to TRP 1004a utilizing a first transmit power (TP-1) based on TPC-1. In addition, the UE 1002 may transmit one or more SRSs to TRP 1004N utilizing the first transmit power (TP-1) based on TPC-1.

Figure 11:
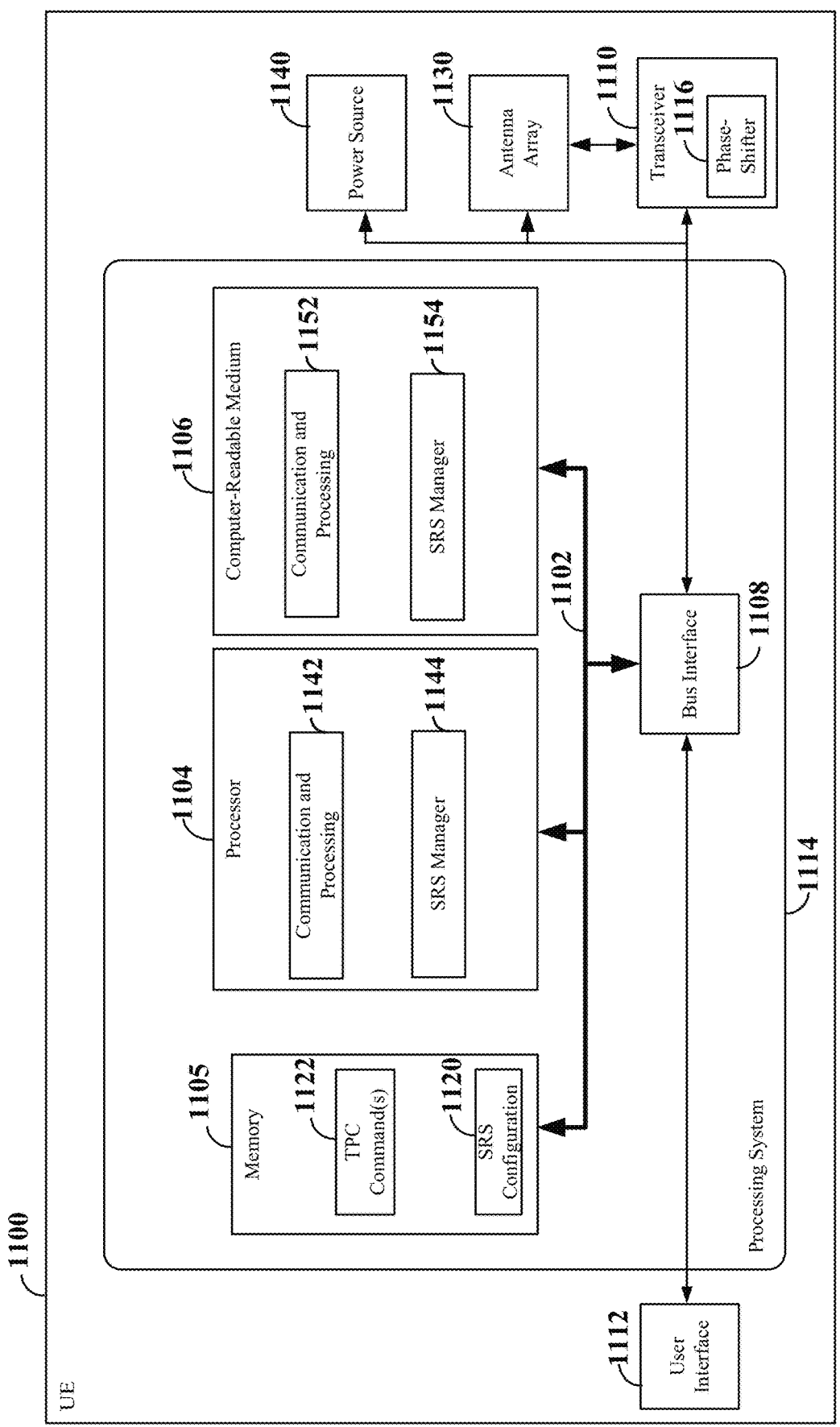
FIG. 11 is a block diagram illustrating an example of a hardware implementation for a UE employing a processing system according to some aspects.

FIG. 11 is a conceptual diagram illustrating an example of a hardware implementation for an exemplary UE 1100 employing a processing system 1114. For example, the UE 1100 may be any of the UEs or scheduled entities illustrated in any one or more of FIGS. 1, 3 and/or 7-10.

The UE 1100 may be implemented with a processing system 1114 that includes one or more processors 1104. Examples of processors 1104 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the UE 1100 may be configured to perform any one or more of the functions described herein. That is, the processor 1104, as utilized in a UE 1100, may be used to implement any one or more of the processes described below in connection with FIG. 11.

The processor 1104 may in some instances be implemented via a baseband or modem chip and in other implementations, the processor 1104 may itself comprise a number of devices distinct and different from a baseband or modem chip (e.g., in such scenarios as may work in concert to achieve aspects discussed herein). And as mentioned above, various hardware arrangements and components outside of a baseband modem processor can be used in implementations, including RF-chains, power amplifiers, modulators, buffers, interleavers, adders/summers, etc.

In this example, the processing system 1114 may be implemented with a bus architecture, represented generally by the bus 1102. The bus 1102 may include any number of interconnecting buses and bridges depending on the specific application of the processing system 1114 and the overall design constraints. The bus 1102 communicatively couples together various circuits including one or more processors (represented generally by the processor 1104), a memory 1105, and computer-readable media (represented generally by the computer-readable medium 1106). The bus 1102 may also link various other circuits such as timing sources, peripherals, voltage regulators, and power management circuits, which are well known in the art, and therefore, will not be described any further. A bus interface 1108 provides an interface between the bus 1102 and a transceiver 1110. The transceiver 1110 provides a means for communicating with various other apparatus over a transmission medium (e.g., air interface). In some examples, the transceiver 1110 may include a phase-shifter 1116 for digital and/or analog beamforming via one or more antenna array(s) 1130. A user interface 1112 (e.g., keypad, display, speaker, microphone, joystick) may also be provided.

The processor 1104 is responsible for managing the bus 1102 and general processing, including the execution of software stored on the computer-readable medium 1106. The software, when executed by the processor 1104, causes the processing system 1114 to perform the various functions described below for any particular apparatus. The computer-readable medium 1106 and the memory 1105 may also be used for storing data that is manipulated by the processor 1104 when executing software.

One or more processors 1104 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 1106.

The computer-readable medium 1106 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 1106 may reside in the processing system 1114, external to the processing system 1114, or distributed across multiple entities including the processing system 1114. The computer-readable medium 1106 may be embodied in a computer program product. In some examples, the computer-readable medium 1106 may be part of the memory 1105. By way of example, a computer program product may include a computer-readable medium in packaging materials. Those skilled in the art will recognize how best to implement the described functionality presented throughout this disclosure depending on the particular application and the overall design constraints imposed on the overall system.

In some aspects of the disclosure, the processor 1104 may include circuitry configured for various functions. For example, the processor 1104 may include communication and processing circuitry 1142, configured to communicate with one or more radio access network (RAN) entities, such as one or more base stations (e.g., gNBs), one or more TRPs, and/or one or more scheduling entities. In some examples, the communication and processing circuitry 1142 may include one or more hardware components that provide the physical structure that performs processes related to wireless communication (e.g., signal reception and/or signal transmission) and signal processing (e.g., processing a received signal and/or processing a signal for transmission).

In some examples, the communication and processing circuitry 1142 may be configured to receive and process downlink beamformed signals at a mmWave frequency or a sub-6 GHz frequency via the transceiver 1110 and the antenna array 1130 (e.g., using the phase-shifter 1116). In addition, the communication and processing circuitry 1142 may be configured to generate and transmit uplink beamformed signals at a mmWave frequency or a sub-6 GHz frequency via the transceiver 1110 and antenna array 1130 (e.g., using the phase-shifter 1116).

The communication and processing circuitry 1142 may further be configured to receive an SRS configuration 1120 for a multi-TRP SRS resource set from a TRP of multiple TRPs in communication with the UE 1100. The multi-TRP SRS resource set may include a plurality of SRS resources associated with the multiple TRPs. The multiple TRPs may be separate base stations or RRHs of a same base station. In some examples, the multiple TRPs may be co-located or positioned at different geographic locations and may belong to the same cell or different cells.

The multi-TRP SRS resource set may be, for example, an aperiodic SRS resource set, periodic SRS resource set, or semi-persistent SRS resource set. In some examples, the SRS configuration may be received within a RRC message. In some examples, the RRC message may include a single RRC configuration (e.g., a single RRC configuration information element (IE)) including the SRS configuration. In other examples, the RRC message may include multiple RRC configurations (e.g., multiple RRC configuration IEs), each including one of a plurality of TRP SRS configurations, each associated with one of the TRPs, where the plurality of TRP SRS configurations collectively form the SRS configuration. The communication and processing circuitry 1142 may further be configured to store the SRS configuration 1120 within, for example, the memory 1105.

The communication and processing circuitry 1142 may further be configured to receive an activation/trigger for the multi-TRP SRS resource set. For example, the communication and processing circuitry 1142 may receive DCI triggering an aperiodic multi-TRP SRS resource set or a MAC-CE activating a semi-persistent multi-TRP SRS resource set. In some examples, the communication and processing circuitry 1142 may be configured to receive DCI including a codepoint triggering the SRS configuration (e.g., when the SRS configuration includes a single RRC configuration) or a codepoint triggering each of the plurality of TRP SRS configurations (e.g., when the SRS configuration includes multiple RRC configurations).

The communication and processing circuitry 1142 may further be configured to receive one or more closed-loop TPC commands 1122. In some examples, the communication and processing circuitry 1142 may receive TPC commands from each TRP of the multiple TRPs. In other examples, the communication and processing circuitry 1142 may receive a TPC command from one of the TRPs. The TPC command(s) may be for either PUSCH transmissions or SRS transmissions. For example, a TPC command for SRS may be received in DCI format 2_3. In addition, the communication and processing circuitry 1142 may be configured to receive one or more timing advance commands from the TRPs.

The communication and processing circuitry 1142 may further be configured to transmit one or more SRSs to the multiple TRPs in accordance with the SRS configuration. In some examples, the communication and processing circuitry 1142 may be configured to control a power source 1140 to generate the SRSs at respective transmit powers based on the TPC command(s). The communication and processing circuitry 1142 may further be configured to execute communication and processing software 1152 stored in the computer-readable medium 1106 to implement one or more of the functions described herein.

The processor 1104 may further include SRS manager circuitry 1144, configured to process the SRS configuration 1120. In some examples, the SRS configuration may include a common set of SRS resource set parameters for the multiple TRPs. For example, the multi-TRP SRS resource set may include one or more SRS resources that each include the same (common) SRS resource parameters (e.g., transmission comb structure, port(s), number of symbols, repetition, etc.). In other examples, the SRS configuration may include a respective set of SRS resource set parameters for each of the multiple TRPs. For example, the SRS configuration can include a plurality of TRP SRS configurations, each associated with a respective TRP, where each TRP SRS configuration includes different respective SRS resource parameters. Each TRP SRS configuration may configure one or more SRS resources associated with a particular TRP. Thus, each TRP SRS configuration may include the SRS resource set parameters configuring the particular SRS resources for that TRP.

In some examples, when each of the TRPs belongs to the same TAG and the QCL association for SRS resources configured for each of the TRPs is the same, the SRS resources associated with the multiple TRPs may be located within consecutive symbols of a slot. In some examples, two of the TRPs may belong to different TAGs or the QCL association for SRS resources configured for two of the TRPs may be different. In this example, the SRS manager circuitry 1144 may be configured to provide a gap length of one or more symbols between the SRS resources associated with each of the TRPs. For example, the SRS manager circuitry 1144 may be configured to provide the gap length between a first set of SRS resources associated with a first TRP and a second set of SRS resources associated with a second TRP.

In some examples, when each of the TRPs belongs to a different TAG, the gap length between the respective SRS resources associated with each of the TRPs may accommodate the different timing advances to be applied to the SRS resources. In some examples, the SRS manager circuitry 1144 may configure the gap length as a function of the different timing advance commands received for each of the TAGs. In other examples, the SRS manager circuitry 1144 may receive the gap length from a TRP. For example, the gap length may be set to accommodate a maximum timing advance difference that may occur between the TAGs. In some examples, the gap length may be received as part of the SRS resource configuration (e.g., within the SRS configuration 1120). In other examples, the gap length may be received separately from the SRS configuration.

In some examples, when the QCL association for the SRS resources associated with each TRP are different, the gap length between the respective SRS resources may enable the SRS manager circuitry 1144 to switch the beam direction and spatial filter of the antenna array 1130 and phase-shifter 1116 from the first QCL association to the second QCL association. In some examples, the SRS manager circuitry 1144 may determine the gap length based on a capability of the UE 1100 (e.g., an amount of time it takes for the SRS manager circuitry 1144 to switch between QCL associations). In other examples, the communication and processing circuitry 1142 may transmit the UE capability to a base station associated with one or more of the TRPs and receive a UE-specific gap length from the base station configured in accordance with the UE capability. In other examples, the gap length received from the base station may be a common gap length configured for all UEs, and the communication and processing circuitry 1142 may be configured to receive an indication of the common gap length from one of the TRPs. The gap length may be received within the SRS configuration 1120 or separately from the SRS configuration.

The SRS manager circuitry 1144 may further be configured to generate the SRSs based on the SRS configuration 1120 and to provide the SRSs to the communication and processing circuitry 1142 for transmission of the SRSs to the multiple TRPs via the transceiver 1110. The SRS manager circuitry 1144 may further be configured to determine a respective transmit power for each of the SRSs based on the TPC command(s) 1122 and to provide the respective transmit power for each of the SRSs to the communication and processing circuitry 1142 for transmission of the SRSs at the appropriate transmit powers. In some examples, the SRS manager circuitry 1144 may be configured to apply a TPC command associated with a first set of SRS resources associated with a first TRP to a second set of SRS resources associated with a second TRP. The SRS manager circuitry 1144 may further be configured to execute SRS manager software 1154 stored in the computer-readable medium 1106 to implement one or more of the functions described herein.

Figure 12:
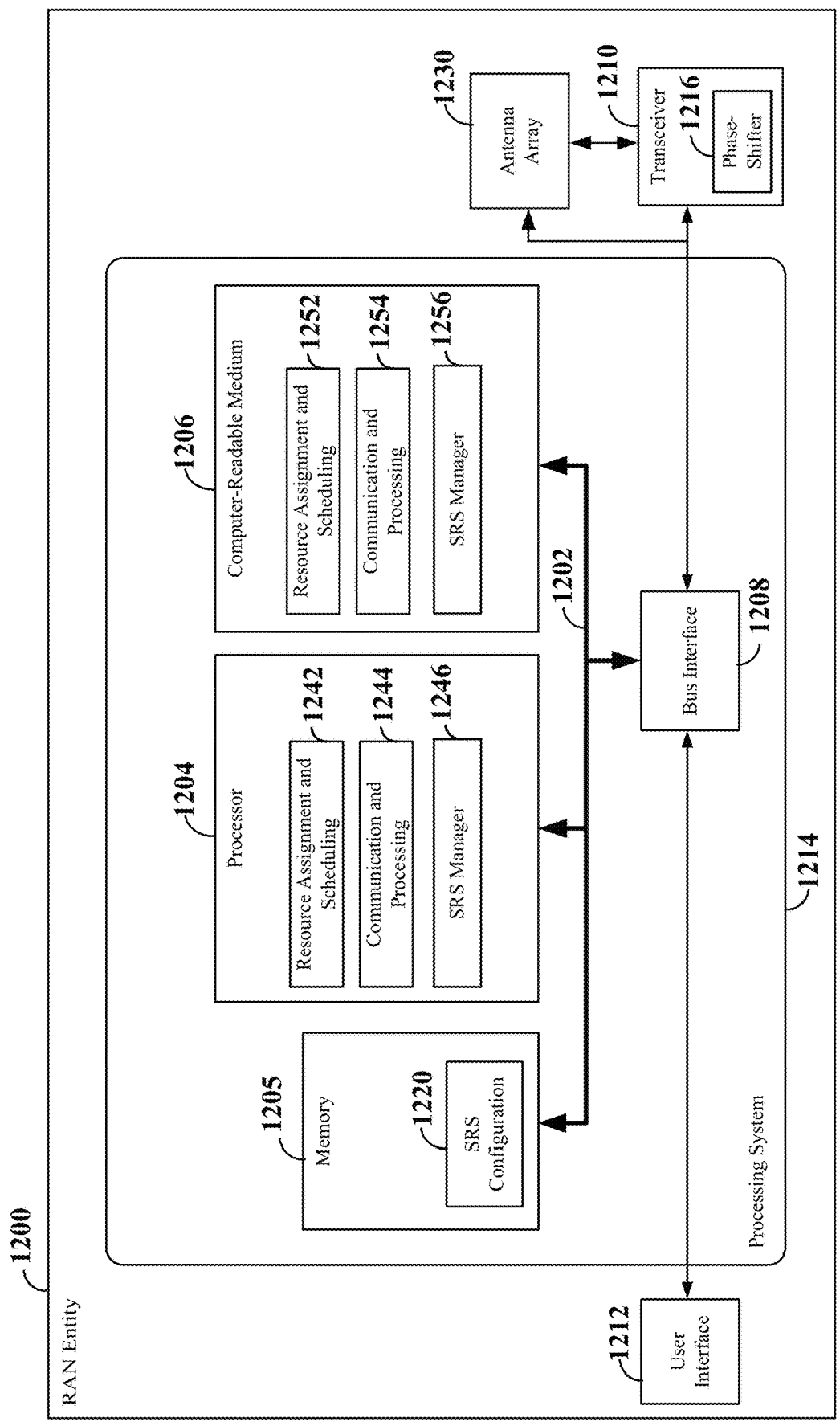
FIG. 12 is a block diagram illustrating an example of a hardware implementation for a radio access network (RAN) entity employing a processing system according to some aspects.

FIG. 12 is a conceptual diagram illustrating an example of a hardware implementation for an exemplary RAN entity 1200 employing a processing system 1214. For example, the RAN entity 1200 may correspond to any of the base stations (e.g., gNBs), TRPs (e.g., combined TRP and base station in a RRH configuration), or other scheduling entities illustrated in any one or more of FIGS. 1, 3, 4, and/or 7-10.

In accordance with various aspects of the disclosure, an element, or any portion of an element, or any combination of elements may be implemented with a processing system 1214 that includes one or more processors 1204. The processing system 1214 may be substantially the same as the processing system 1114 illustrated in FIG. 11, including a bus interface 1208, a bus 1202, memory 1205, a processor 1204, and a computer-readable medium 1206. Furthermore, the RAN entity 1200 may include an optional user interface 1212 and a transceiver 1210 substantially similar to those described above in FIG. 11. In some examples, the transceiver 1210 may include a phase-shifter 1216 for digital and/or analog beamforming via one or more antenna array(s) 1230. The processor 1204, as utilized in a RAN entity 1200, may be used to implement any one or more of the processes described below.

In some aspects of the disclosure, the processor 1204 may include circuitry configured for various functions. For example, the processor 1204 may include resource assignment and scheduling circuitry 1242, configured to generate, schedule, and modify a resource assignment or grant of time-frequency resources (e.g., a set of one or more resource elements). For example, the resource assignment and scheduling circuitry 1242 may schedule time-frequency resources within a plurality of time division duplex (TDD) and/or frequency division duplex (FDD) subframes, slots, and/or mini-slots to carry user data traffic and/or control information to and/or from multiple UEs.

In some examples, the resource assignment and scheduling circuitry 1242 may be configured to schedule resources for the transmission of an SRS configuration for a multi-TRP SRS resource set to a user equipment (UE) in communication with the RAN entity 1200. The resource assignment and scheduling circuitry 1242 may further be configured to schedule resources for the reception of one or more SRSs from the UE in accordance with the SRS configuration. The resource assignment and scheduling circuitry 1242 may further be configured to schedule resources for the transmission of DCI triggering the SRS configuration or a MAC-CE activating the SRS configuration. In addition, the resource assignment and scheduling circuitry 1242 may further be configured to schedule resources for the transmission of a TPC command to the UE. The resource assignment and scheduling circuitry 1242 may further be configured to execute resource assignment and scheduling software 1252 stored in the computer-readable medium 1206 to implement one or more of the functions described herein.

The processor 1204 may further include communication and processing circuitry 1244, configured to communicate with the UE. In some examples, the communication and processing circuitry 1244 may include one or more hardware components that provide the physical structure that performs processes related to wireless communication (e.g., signal reception and/or signal transmission) and signal processing (e.g., processing a received signal and/or processing a signal for transmission).

In some examples, the communication and processing circuitry 1244 may be configured to receive and process uplink beamformed signals at a mmWave frequency or a sub-6 GHz frequency via the transceiver 1210 and the antenna array 1230 (e.g., using the phase-shifter 1216). In addition, the communication and processing circuitry 1244 may be configured to generate and transmit uplink beamformed signals at a mmWave frequency or a sub-6 GHz frequency via the transceiver 1210 and antenna array 1230 (e.g., using the phase-shifter 1216).

The communication and processing circuitry 1244 may further be configured to transmit an SRS configuration 1220 for the multi-TRP SRS resource set to the UE. The multi-TRP SRS resource set may include a plurality of SRS resources associated with the multiple TRPs. The multiple TRPs may be separate base stations or RRHs of a same base station. In the former example, the RAN entity 1200 may correspond to one of the base stations. In the latter example, the RAN entity 1200 may be coupled to each of the multiple TRPs. In some examples, the multiple TRPs may be co-located or positioned at different geographic locations and may belong to the same cell or different cells.

The multi-TRP SRS resource set may be, for example, an aperiodic SRS resource set, periodic SRS resource set, or semi-persistent SRS resource set. In some examples, the SRS configuration may be transmitted within a RRC message. In some examples, the RRC message may include a single RRC configuration (e.g., a single RRC configuration information element (IE)) including the SRS configuration. In other examples, the RRC message may include multiple RRC configurations (e.g., multiple RRC configuration IEs), each including one of a plurality of TRP SRS configurations, each associated with one of the TRPs, where the plurality of TRP SRS configurations collectively form the SRS configuration. The communication and processing circuitry 1244 may further be configured to store the SRS configuration 1220 within, for example, the memory 1205.

The communication and processing circuitry 1244 may further be configured to transmit an activation/trigger for the multi-TRP SRS resource set. For example, the communication and processing circuitry 1244 may transmit DCI triggering an aperiodic multi-TRP SRS resource set or a MAC-CE activating a semi-persistent multi-TRP SRS resource set. In some examples, the communication and processing circuitry 1244 may be configured to transmit DCI including a codepoint triggering the SRS configuration (e.g., when the SRS configuration includes a single RRC configuration) or a codepoint triggering each of the plurality of TRP SRS configurations (e.g., when the SRS configuration includes multiple RRC configurations).

The communication and processing circuitry 1244 may further be configured to transmit at least one closed-loop TPC command to the UE. The TPC command may be for either PUSCH transmissions or SRS transmissions. For example, a TPC command for SRS may be received in DCI format 2_3. In some examples, the TPC command is associated with one of the TRPs. In other examples, the TPC command may be applicable to each of the TRPs. In addition, the communication and processing circuitry 1244 may be configured to transmit a timing advance command to the UE. The timing advance command indicates a timing advance to be applied by the UE to uplink signals transmitted to the TRPs within a TAG. Here, at least one of the TRPs in the TAG is associated with (e.g., part of) the RAN entity 1200. The communication and processing circuitry 1244 may further be configured to receive one or more SRSs in accordance with the SRS configuration. The communication and processing circuitry 1244 may further be configured to execute communication and processing software 1254 stored in the computer-readable medium 1206 to implement one or more of the functions described herein.

The processor 1204 may further include SRS manager circuitry 1246, configured to configure the SRS configuration for the multi-TRP SRS resource set for the UE. In some examples, the SRS configuration may include a common set of SRS resource set parameters for the multiple TRPs. For example, the multi-TRP SRS resource set may include one or more SRS resources that each include the same (common) SRS resource parameters (e.g., transmission comb structure, port(s), number of symbols, repetition, etc.). In other examples, the SRS configuration may include a respective set of SRS resource set parameters for each of the multiple TRPs. For example, the SRS configuration can include a plurality of TRP SRS configurations, each associated with a respective TRP, where each TRP SRS configuration includes different respective SRS resource parameters. Each TRP SRS configuration may configure one or more SRS resources associated with a particular TRP. Thus, each TRP SRS configuration may include the SRS resource set parameters configuring the particular SRS resources for that TRP.

In some examples, when each of the TRPs belongs to the same TAG and the QCL association for SRS resources configured for each of the TRPs is the same, the SRS manager circuitry 1246 can configure the SRS resources associated with the multiple TRPs to be located within consecutive symbols of a slot. In some examples, when two of the TRPs may belong to different TAGs or the QCL association for SRS resources configured for two of the TRPs is different, the SRS manager circuitry 1246 may be configured to determine a gap length of one or more symbols to be applied between the SRS resources associated with each of the TRPs. For example, the SRS manager circuitry 1246 may be configured to determine the gap length to be applied between a first set of SRS resources associated with a first TRP and a second set of SRS resources associated with a second TRP.

In some examples, when the TRPs belong to different TAGs, the SRS manager circuitry 1246 may set the gap length to accommodate a maximum timing advance difference that may occur between the TAGs. In other examples, when the QCL association between the SRS resources associated with each of the TRPs is different, the SRS manager circuitry 1246 may set the gap length based on a capability of the UE or as a common gap length configured for all UEs. In some examples, the SRS manager circuitry 1246 may transmit an indication of the gap length as part of the SRS resource configuration (e.g., within the SRS configuration 1220) or separately from the SRS configuration via the communication and processing circuitry 1244 and transceiver 1210.

The SRS manager circuitry 1246 may further receive and process each of the SRSs received from the UE to obtain respective measurements (e.g., RSRP, RSRQ, etc.) of each of the received SRSs for uplink beam management. The SRS manager circuitry 1246 may further be configured to execute SRS manager software 1256 stored in the computer-readable medium 1206 to implement one or more of the functions described herein.

Figure 13:
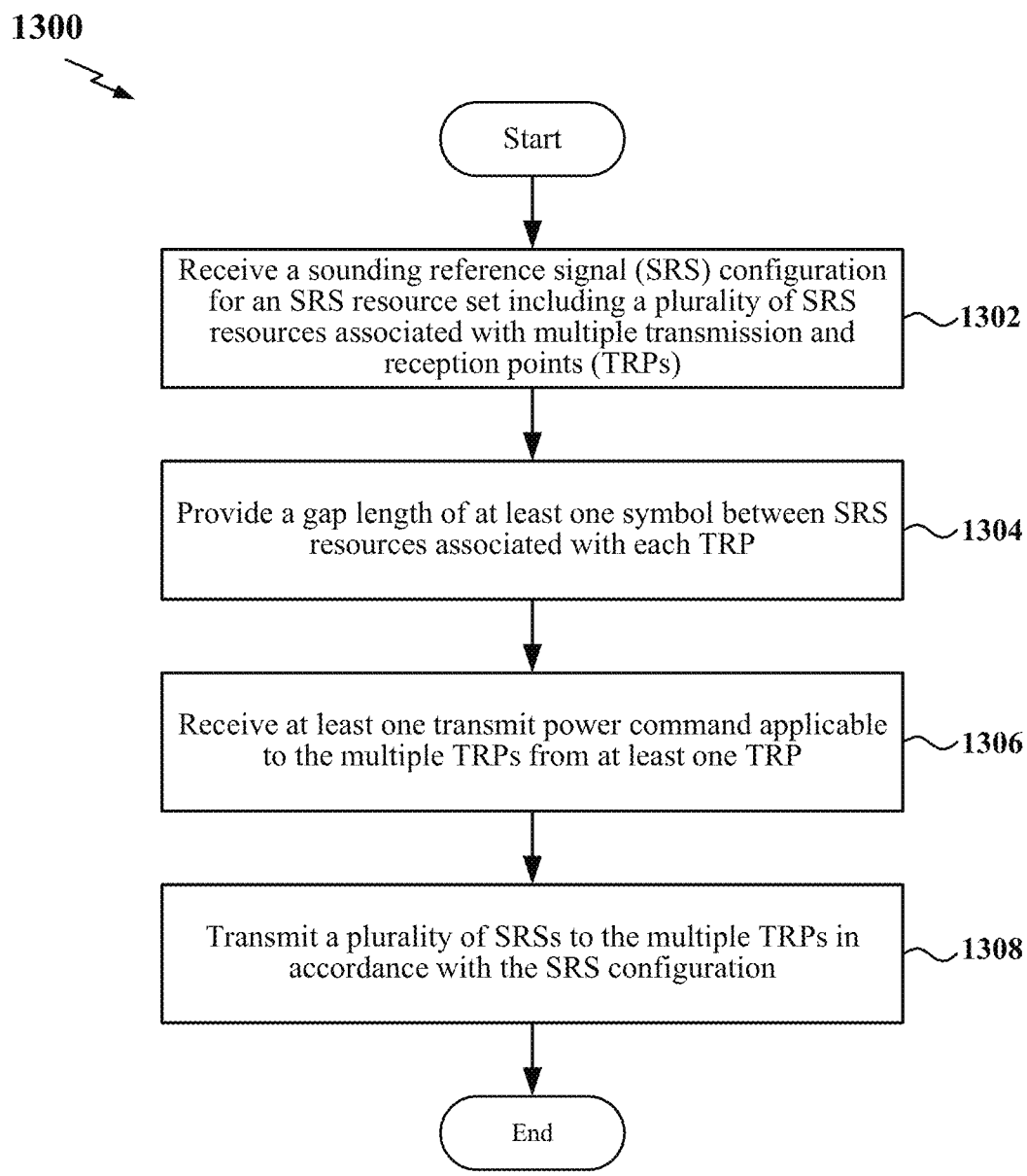
FIG. 13 is a flow chart of an exemplary method for a UE to utilize a multi-TRP SRS resource set according to some aspects.

FIG. 13 is a flow chart illustrating an example of a method 1300 for a UE to utilize a multi-TRP SRS resource set according to some aspects. As described below, some or all illustrated features may be omitted in a particular implementation within the scope of the present disclosure, and some illustrated features may not be required for implementation of all aspects. In some examples, the method may be performed by the UE 1100, as described above and illustrated in FIG. 11, by a processor or processing system, or by any suitable means for carrying out the described functions.

At block 1302, the UE may receive a sounding reference signal (SRS) configuration for an SRS resource set including a plurality of SRS resources associated with multiple transmission and reception points (TRPs). In some examples, the SRS resource set includes a periodic SRS resource set, a semi-persistent SRS resource set, or an aperiodic SRS resource set. In some examples, the SRS resource set is an aperiodic SRS resource set. In this example, the UE may further receive control information (e.g., DCI) including a codepoint triggering the SRS configuration or a codepoint triggering a plurality of TRP SRS configurations of the SRS configuration, where each TRP SRS configuration is associated with a respective TRP of the multiple TRPs.

In some examples, the multiple TRPs each include a same PCI. In other examples, at least two of the TRPs of the multiple TRPs each include a different respective PCI. In some examples, the multiple TRPs belong to the same TAG. In this example, the SRS resources associated with the multiple TRPs may be located within consecutive symbols of a slot. In other examples, at least two of the TRPs of the multiple TRPs belong to different respective TAGs.

In some examples, the SRS configuration includes a respective set of SRS resource set parameters for each of the multiple TRPs. In other examples, the SRS configuration includes a common set of SRS resource set parameters for the multiple TRPs. For example, the communication and processing circuitry 1142, together with the SRS manager circuitry 1144, transceiver 1110, and antenna array 1130, shown and described above in connection with FIG. 11, may provide a means for receiving the SRS configuration.

At block 1304, the UE may optionally provide a gap length of at least one symbol between the SRS resources associated with each TRP of the multiple TRPs. For example, the SRS resources associated with the multiple TRPs may include a first set of SRS resources associated with a first TAG and a second set of SRS resources associated with a second TAG. In this example, a gap length of at least one symbol may be provided between the first set of SRS resources and the second set of SRS resources. In some examples, the UE may configure the gap length based on a timing difference between a first timing advance command associated with the first TAG and a second timing advance command associated with the second TAG. In other examples, the UE may receive the gap length from a TRP of the multiple TRPs.

In some examples, the SRS resources associated with the multiple TRPs include a first set of SRS resources associated with a first TRP of the multiple TRPs and a second set of SRS resources associated with a second TRP of the multiple TRPs. The first set of SRS resources may include a first quasi co-location (QCL) association and the second set of SRS resources may include a second QCL association different than the first QCL association. In this example, a gap length of one or more symbols may be provided between the first set of SRS resources and the second set of SRS resources. In some examples, the UE may determine the gap length based on a capability of the UE. In other examples, the UE may receive an indication of the gap length from a TRP of the multiple TRPs. For example, the SRS manager circuitry 1144 shown and described above in connection with FIG. 11, may provide a means for providing the gap length.

At block 1306, the UE may optionally receive at least one transmit power control (TPC) command applicable to the multiple TRPs from at least one of the TRPs. In some examples, the UE may receive multiple TPC commands, each associated with a TRP of the multiple TRPs. In other examples, the UE may receive a TPC command applicable to each of the TRPs. For example, the SRS resources associated with the multiple TRPs may include a first set of SRS resources associated with a first TRP of the multiple TRPs and a second set of SRS resources associated with a second TRP of the multiple TRPs. The UE may receive a TPC command for the first set of SRS resources and apply the TPC command to the second set of SRS resources. For example, the communication and processing circuitry 1142, together with the SRS manager circuitry 1144, transceiver 1110, and antenna array 1130, shown and described above in connection with FIG. 11, may provide a means for receiving the TPC command.

At block 1308, the UE may transmit a plurality of SRSs to the multiple TRPs in accordance with the SRS configuration. In some examples, the UE may transmit the plurality of SRSs to the multiple TRPs utilizing a respective transmit power for each of the multiple TRPs based on multiple TPC commands. In other examples, the UE may transmit the plurality of SRSs to the multiple TRPs utilizing a same transmit power for each of the plurality of SRSs based on a single TPC command. For example, the communication and processing circuitry 1142, together with the SRS manager circuitry 1144, transceiver 1110, power source 1140, and antenna array 1130, shown and described above in connection with FIG. 11 may provide a means for transmitting the plurality of SRSs.

In one configuration, the UE 1100 includes means for performing the various functions and processes described in relation to FIG. 13. In one aspect, the aforementioned means may be the processor 1104 shown in FIG. 11 configured to perform the functions recited by the aforementioned means. In another aspect, the aforementioned means may be a circuit or any apparatus configured to perform the functions recited by the aforementioned means.

Of course, in the above examples, the circuitry included in the processor 1104 is merely provided as an example, and other means for carrying out the described functions may be included within various aspects of the present disclosure, including but not limited to the instructions stored in the computer-readable storage medium 1106, or any other suitable apparatus or means described in any one of the FIGS. 1, 3, 4, and/or 7-10, and utilizing, for example, the processes and/or algorithms described herein in relation to FIG. 13.

Figure 14:
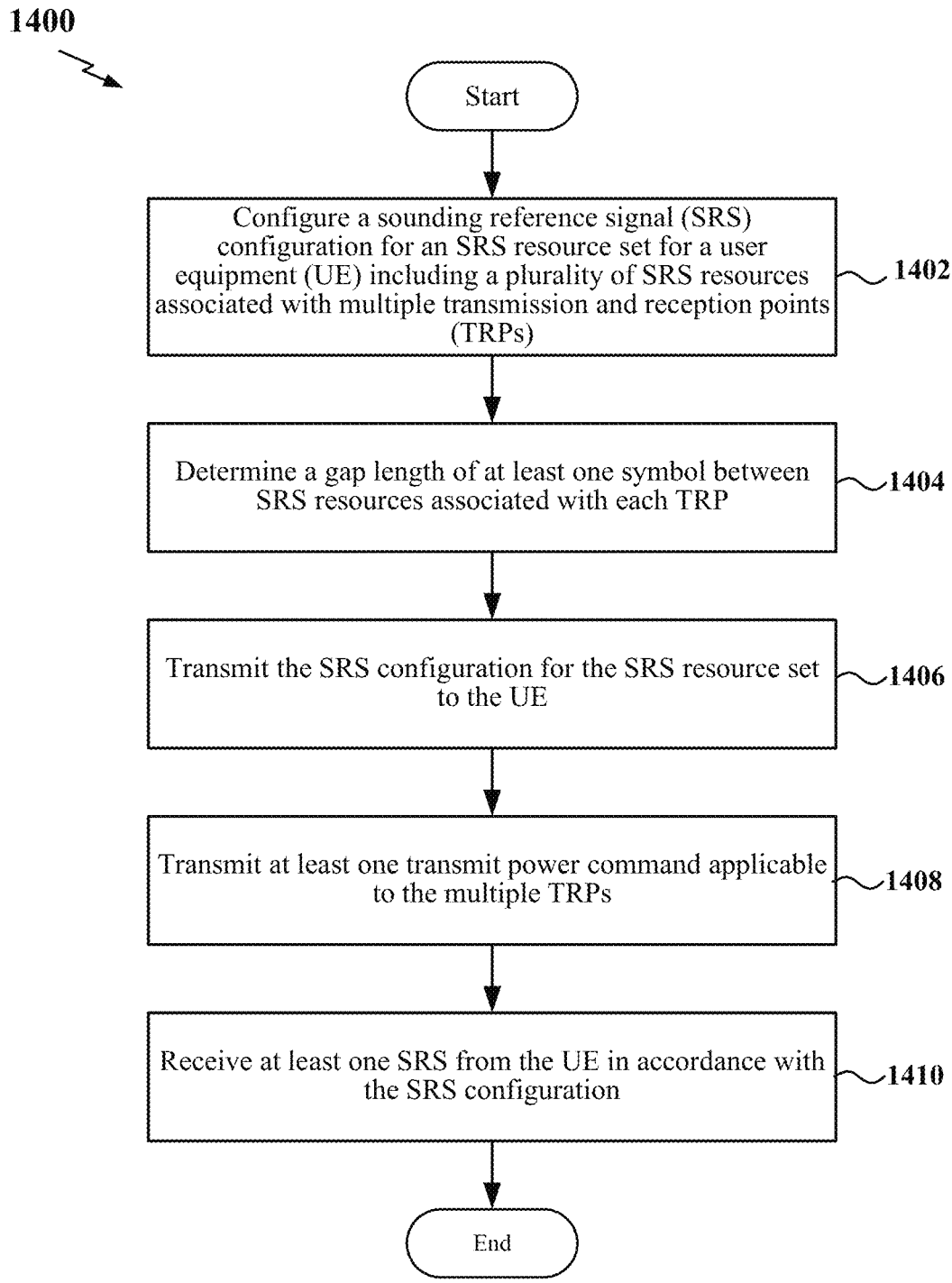
FIG. 14 is a flow chart of an exemplary method for a RAN entity to configure a multi-TRP SRS resource set according to some aspects.

FIG. 14 is a flow chart illustrating an example of a method 1400 for a RAN entity to configure a multi-TRP SRS resource set according to some aspects. As described below, some or all illustrated features may be omitted in a particular implementation within the scope of the present disclosure, and some illustrated features may not be required for implementation of all aspects. In some examples, the method may be performed by the RAN entity 1200, as described above and illustrated in FIG. 12, by a processor or processing system, or by any suitable means for carrying out the described functions.

At block 1402, the RAN entity may configure a sounding reference signal (SRS) configuration for an SRS resource set for a user equipment (UE) including a plurality of SRS resources associated with multiple transmission and reception points (TRPs). In some examples, the SRS resource set includes a periodic SRS resource set, a semi-persistent SRS resource set, or an aperiodic SRS resource set.

In some examples, the multiple TRPs each include a same PCI. In other examples, at least two of the TRPs of the multiple TRPs each include a different respective PCI. In some examples, the multiple TRPs belong to the same TAG. In this example, the SRS resources associated with the multiple TRPs may be located within consecutive symbols of a slot. In other examples, at least two of the TRPs of the multiple TRPs belong to different respective TAGs. In some examples, the SRS configuration includes a respective set of SRS resource set parameters for each of the multiple TRPs. In other examples, the SRS configuration includes a common set of SRS resource set parameters for the multiple TRPs. For example, the SRS manager circuitry 1246, shown and described above in connection with FIG. 12 may provide a means to configure the SRS configuration.

At block 1404, the RAN entity may optionally determine a gap length of at least one symbol between SRS resources associated with each TRP of the multiple TRPs. In some examples, the SRS resources associated with the multiple TRPs include a first set of SRS resources associated with a first TAG and a second set of SRS resources associated with a second TAG. In this example, the RAN entity may determine a gap length of at least one symbol to be applied between the first set of SRS resources and the second set of SRS resources. In some examples, the RAN entity may further transmit an indication of the gap length to the UE.

In some examples, the SRS resources associated with the multiple TRPs include a first set of SRS resources associated with a first TRP of the multiple TRPs and a second set of SRS resources associated with a second TRP of the multiple TRPs. The first set of SRS resources may include a first quasi co-location (QCL) association and the second set of SRS resources may include a second QCL association different than the first QCL association. In this example, the RAN entity may determine a gap length of at least one symbol to be applied between the first set of SRS resources and the second set of SRS resources. In some examples, the RAN entity may further transmit an indication of the gap length to the UE. In some examples, the RAN entity may determine the gap length based on a capability of the UE. For example, the SRS manager circuitry 1246, shown and described above in connection with FIG. 12 may provide a means to determine the gap length.

At block 1406, the RAN entity may transmit the SRS configuration for the SRS resource set to the UE. In some examples, the SRS resource set is an aperiodic SRS resource set. In this example, the RAN entity may further transmit control information (e.g., DCI) including a codepoint triggering the SRS configuration or a codepoint triggering a plurality of TRP SRS configurations of the SRS configuration, where each TRP SRS configuration is associated with a respective TRP of the multiple TRPs. For example, the communication and processing circuitry 1244, together with the SRS manager circuitry 1246, transceiver 1210 and antenna array 1230, shown and described above in connection to FIG. 12, may provide a means for transmitting the SRS configuration.

At block 1408, the RAN entity may optionally transmit at least one TPC command applicable to the multiple TRPs to the UE. Each of the at least one TPC command may be associated with a respective TRP of the multiple TRPs. In other examples, the RAN entity may transmit a TPC command applicable to each of the TRPs to the UE. For example, the communication and processing circuitry 1244, together with the SRS manager circuitry 1246, transceiver 1210 and antenna array 1230, shown and described above in connection to FIG. 12, may provide a means for transmitting the at least one TPC command to the UE.

At block 1410, the RAN entity may receive at least one SRS from the UE in accordance with the SRS configuration. For example, the communication and processing circuitry 1244, together with the SRS manager circuitry 1246, transceiver 1210 and antenna array 1230, shown and described above in connection to FIG. 12, may provide a means for receiving the at least one SRS.

Figure 15:
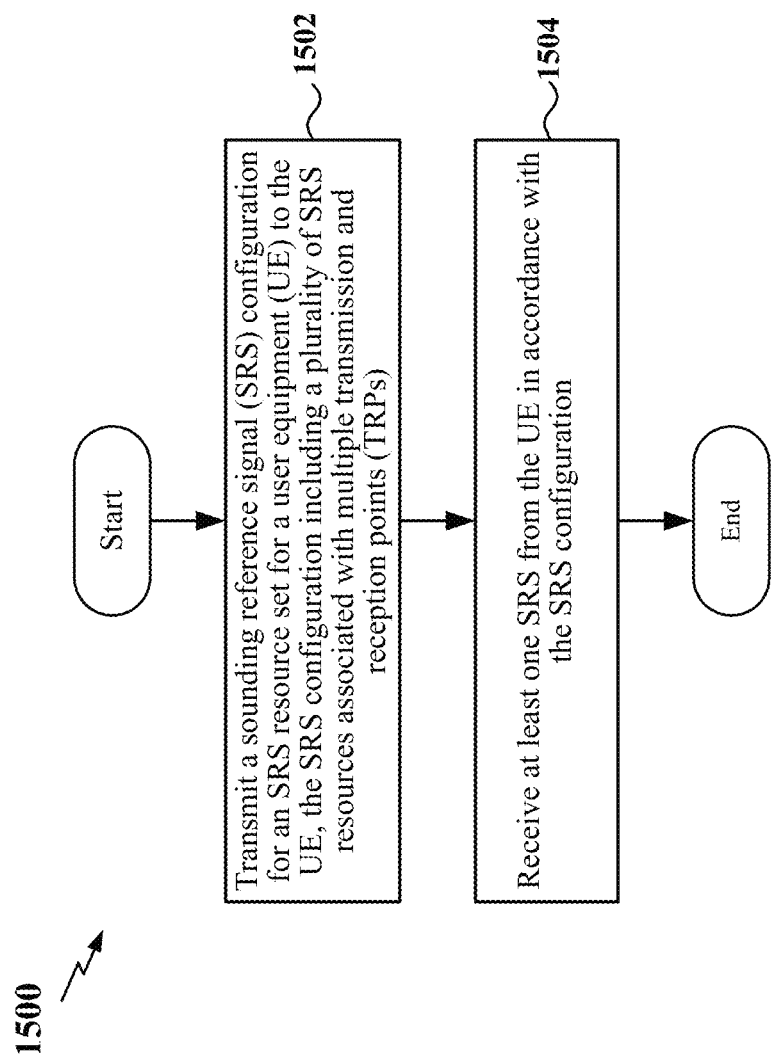
FIG. 15 is a flow chart of an exemplary method for a RAN entity to utilize a multi-TRP SRS resource set according to some aspects.

FIG. 15 is a flow chart of an exemplary method 1500 for a RAN entity to utilize a multi-TRP SRS resource set according to some aspects. As described below, some or all illustrated features may be omitted in a particular implementation within the scope of the present disclosure, and some illustrated features may not be required for implementation of all aspects. In some examples, the method may be performed by the RAN entity 1200, as described above and illustrated in FIG. 12, by a processor or processing system, or by any suitable means for carrying out the described functions.

At block 1502, the RAN entity may transmit a sounding reference signal (SRS) configuration for an SRS resource set for a user equipment (UE) to a UE. The SRS configuration can include a plurality of SRS resources associated with multiple transmission and reception points (TRPs). In some examples, the multiple TRPs each include a same PCI. In other examples, at least two of the TRPs of the multiple TRPs each include a different respective PCI.

In some examples, the multiple TRPs belong to the same TAG. In this example, the SRS resources associated with the multiple TRPs may be located within consecutive symbols of a slot. In other examples, at least two of the TRPs of the multiple TRPs belong to different respective TAGs. In this example, the plurality of SRS resources associated with the multiple TRPs can include a first set of SRS resources associated with a first TAG and a second set of SRS resources associated with a second TAG. The RAN entity may then further determine a gap length of at least one symbol between the first set of SRS resources and the second set of SRS resources and transmit an indication of the gap length to the UE.

In some examples, the plurality of SRS resources associated with the multiple TRPs can include a first set of SRS resources associated with a first TRP of the multiple TRPs and a second set of SRS resources associated with a second TRP of the multiple TRPs. The first set of SRS resources can include a first quasi co-location (QCL) association and the second set of SRS resources can include a second QCL association different than the first QCL association. In this example, the RAN entity may further determine a gap length of at least one symbol to be applied between the first set of SRS resources and the second set of SRS resources and transmit an indication of the gap length to the UE. In some examples, the RAN entity may determine the gap length based on a capability of the UE.

In some examples, the SRS configuration includes at least one of a respective set of SRS resource set parameters for each of the multiple TRPs or a common set of SRS resource set parameters for the multiple TRPs. In some examples, the RAN entity may transmit at least one TPC command to the UE. Each of the at least one TPC command may be associated with a respective TRP of the multiple TRPs. In other examples, the RAN entity may transmit a TPC command applicable to each of the TRPs to the UE.

In some examples, the SRS resource set is an aperiodic SRS resource set and the SRS configuration includes a plurality of TRP SRS configurations, each associated with a respective TRP of the multiple TRPs. In this example, the RAN entity may further transmit control information (e.g., DCI) including a codepoint triggering the plurality of TRP SRS configurations. For example, the communication and processing circuitry 1244, together with the SRS manager circuitry 1246, transceiver 1210 and antenna array 1230, shown and described above in connection to FIG. 12, may provide a means for transmitting the SRS configuration.

At block 1504, the RAN entity may receive at least one SRS from the UE in accordance with the SRS configuration. For example, the communication and processing circuitry 1244, together with the SRS manager circuitry 1246, transceiver 1210 and antenna array 1230, shown and described above in connection to FIG. 12, may provide a means for receiving the at least one SRS.

In one configuration, the RAN entity 1200 includes means for performing the various functions and processes described in relation to FIG. 14 and/or FIG. 15. In one aspect, the aforementioned means may be the processor 1204 shown in FIG. 12 configured to perform the functions recited by the aforementioned means. In another aspect, the aforementioned means may be a circuit or any apparatus configured to perform the functions recited by the aforementioned means.

Of course, in the above examples, the circuitry included in the processor 1204 is merely provided as an example, and other means for carrying out the described functions may be included within various aspects of the present disclosure, including but not limited to the instructions stored in the computer-readable storage medium 1206, or any other suitable apparatus or means described in any one of the FIGS. 1, 3, 4, and/or 7-10, and utilizing, for example, the processes and/or algorithms described herein in relation to FIGS. 14 and/or 15.

In 5G NR networks, a base station may be an aggregated base station, in which the radio protocol stack is logically integrated within a single RAN entity, or a disaggregated base station (e.g., a disaggregated RAN entity), in which the radio protocol stack is logically split between a central unit (CU) and one or more distributed units (DUs). The CU hosts the radio resource control (RRC), service data adaptation protocol (SDAP), and packet data convergence protocol (PDCP) layers that control the operation of one or more DUs. The DU hosts the radio link control (RLC), medium access control (MAC) and physical (PHY) layers. The CU may be implemented within an edge RAN node, which may be referred to as a donor node, while the one or more DUs may be co-located with the CU and/or distributed throughout multiple RAN nodes that may be physically separated from one another.

In some examples, the RAN entity 1200 shown and described above in connection with FIG. 12 may be a disaggregated base station. For example, the RAN entity 1200 shown in FIG. 12 may include the CU and optionally one or more DUs of the disaggregated base station. Other DUs associated with the RAN entity 1200 may be distributed throughout the network. In this example, the DUs may correspond to the TRPs associated with the RAN entity. For example, the CU of the disaggregated base station (e.g., within the RAN entity 1200) may configure an SRS resource set including SRS resources associated with multiple TRPs (e.g., DUs) and transmit an SRS configuration of the SRS resource set to one or more UEs in communication with the TRPs.

Figure 16:
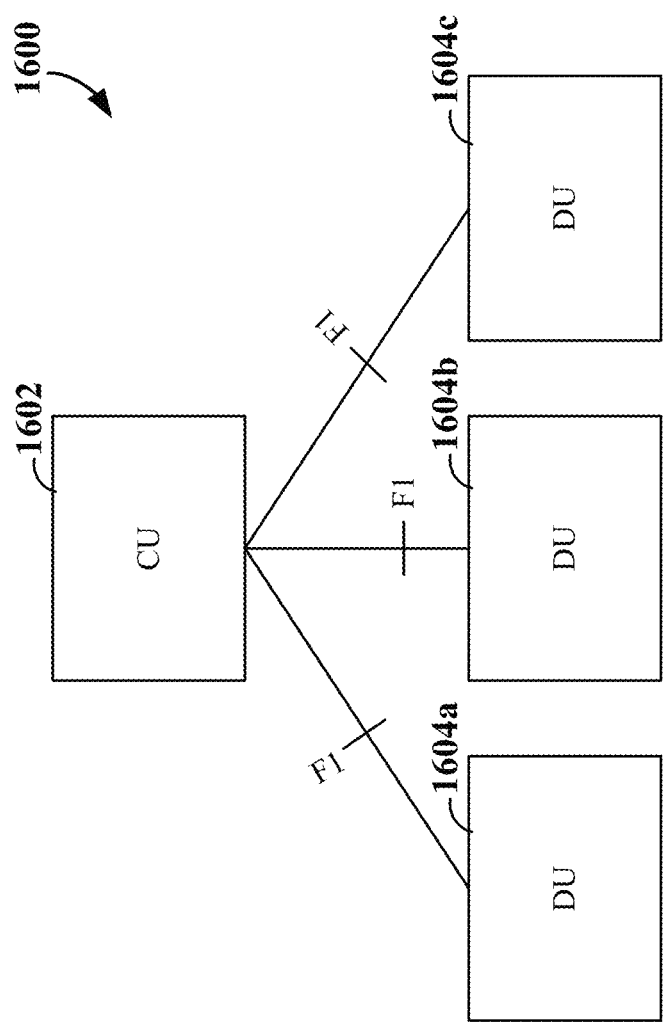
FIG. 16 is a diagram providing a high-level illustration of one example of a network configuration including an integrated access backhaul (IAB) network according to some aspects.

FIG. 16 illustrates an example of a disaggregated base station 1600 according to some aspects. The disaggregated base station 1600 includes a CU 1602 and one or more DUs (three of which, 1604*a*, 1604*b*, 1604*c*, are shown for convenience). Each DU 1604*a*, 1604*b*, and 1604*c* supports the PHY, MAC, and RLC layers of the radio protocol stack. The CU 1602 supports the higher layers, such as the PDCP and RRC layers. One of the DUs (e.g., DU 1604*a*) may be co-located with the CU 1602, while the other DUs 1604*b* and 1604*c* may be distributed throughout a network. The CU 1602 and DUs 1604*a*, 1604*b*, and 1604*c* are logically connected via the F1 interface, which utilizes the F1 Application Protocol (F1-AP) for communication of information between the CU 1602 and each of the DUs 1604*a*, 1604*b*, and 1604*c* and for establishing generic tunneling protocol (GTP) tunnels between the DU and CU for each radio bearer. In some examples, each of the DUs 1640*a*, 1640*b*, and 1640*c* may correspond to a TRP of a set of multiple TRPs for which a single SRS resource set may be configured by the CU 1602, as described herein.

Disaggregated base stations 1600 may be utilized, for example, in integrated access backhaul (IAB) networks. In such an IAB network, the wireless spectrum may be used for both access links and backhaul links. In some examples, the wireless spectrum may utilize millimeter-wave (mmWave) or sub-6 GHz carrier frequencies.

Figure 17:
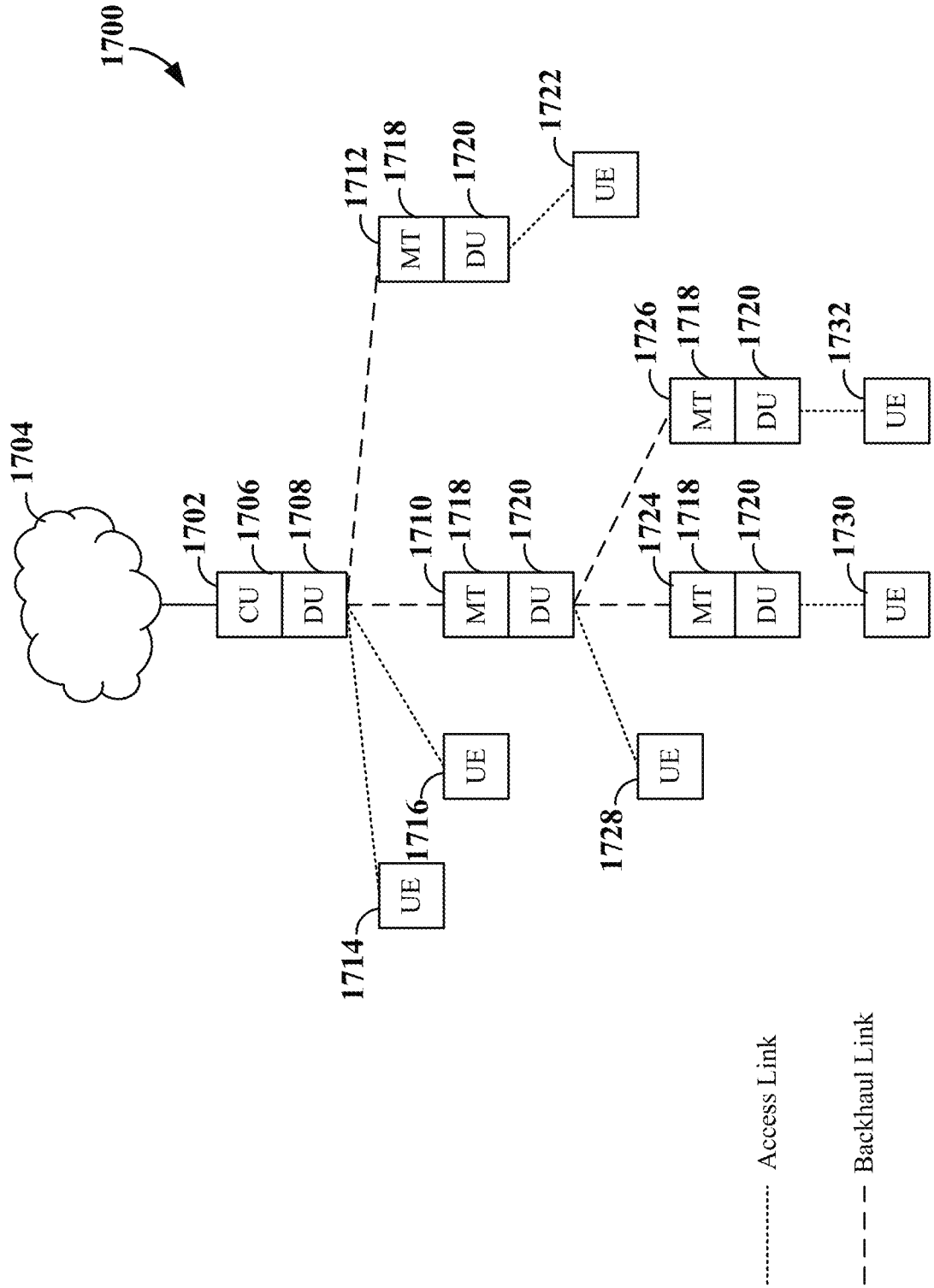
FIG. 17 is a diagram illustrating an example of IAB node functionality within an IAB network according to some aspects.

FIG. 17 is a schematic diagram illustrating an example of IAB node functionality within an IAB network 1700. In the example shown in FIG. 17, an IAB node 1702 is shown coupled to a core network 1704 via a wireline connection. This IAB node 1702 may be referred to herein as an IAB donor node, which may be, for example, an enhanced gNB including functionality for controlling the IAB network 1700. In some examples, the IAB donor node 1702 may include a central unit (CU) 1706 and a distributed unit (DU) 1708. The CU 1706 is configured to operate as a centralized network node (or central entity) within the IAB network 1700. For example, the CU 1706 may include radio resource control (RRC) layer functionality and packet data convergence protocol (PDCP) layer functionality to control/configure the other nodes (e.g., IAB nodes and UEs) within the IAB network 1700. Thus, the CU 1706 can be configured to implement centralized mechanisms for handover decisions, topology changes, routing, bearer mapping, UE security, and other suitable services.

The DU 1708 is configured to operate as a scheduling entity to schedule scheduled entities (e.g., other IAB nodes and UEs) of the IAB donor node 1702. For example, the DU 1708 of the IAB donor node 1702 may operate as a scheduling entity to schedule IAB nodes 1710 and 1712 and UEs 1714 and 1716. Thus, the DU 1708 of the IAB donor node 1702 may schedule communication with IAB nodes 1710 and 1712 via respective backhaul links and schedule communication with UEs 1714 and 1716 via respective access links. In some examples, the DU 1708 may include the radio link control (RLC), medium access control (MAC), and physical (PHY) layer functionality to enable operation as a scheduling entity.

Each of the IAB nodes 1710 and 1712 may be configured as a Layer 2 (L2) relay node including a respective DU 1720 and a mobile termination (MT) unit 1718 to enable each L2 relay IAB node 1710 and 1712 to operate as a scheduling entity and a scheduled entity. For example, the MT unit 1718 within each of the L2 relay IAB nodes 1710 and 1712 is configured to operate as a scheduled entity that may be scheduled by the IAB donor node 1702. Each MT unit 1718 within the L2 relay IAB nodes 1710 and 1712 further facilitates communication with the IAB donor node 1702 via respective backhaul links. In addition, the DU 1720 within each of the L2 relay IAB nodes 1710 and 1712 operates similar to the DU 1708 within the IAB donor node 1702 to function as a scheduling entity to schedule one or more respective scheduled entities (e.g., other IAB nodes and/or UEs) of the L2 relay IAB nodes 1710 and 1712.

For example, the DU 1720 of L2 relay IAB node 1712 functions as a scheduling entity to schedule communication with a UE 1722 via an access link, while the DU 1720 of L2 relay IAB node 1710 functions as a scheduling entity to schedule communication with the MT units 1718 of L2 relay IAB nodes 1724 and 1726 via respective backhaul links and a UE 1728 via an access link. Each of the L2 relay IAB nodes 1724 and 1726 further includes a respective DU 1720 that functions as a scheduling entity to communicate with respective UEs 1730 and 1732.

In some examples, each of the IAB nodes 1702, 1710, 1712, 1724, and 1726 may be interconnected via one or more wireless backhaul links. Each of the wireless backhaul links may utilize the same wireless spectrum (e.g., the radio frequency (RF) spectrum) as the access links to backhaul access traffic to/from the core network 1704. This may be referred to as wireless self-backhauling. Such wireless self-backhauling can enable fast and easy deployment of highly dense small cell networks. That is, rather than requiring each new gNB deployment to be outfitted with its own hard-wired backhaul connection, the wireless spectrum utilized for communication between the gNB and UE may be leveraged for backhaul communication between any number of IAB nodes to form the IAB network 1700. In addition, some or all of the IAB nodes 1702, 1710, 1712, 1724, and 1726 may also be connected via wired backhaul links (e.g., fiber, coaxial cable, Ethernet, copper wires, etc.) and/or microwave backhaul links. Thus, the IAB network 1700 may support both wired/microwave and wireless backhaul traffic.

In the network topology illustrated in FIG. 17, the IAB donor node 1702, in combination with each of the L2 relay IAB nodes 1710, 1712, 1724 and 1726, can collectively form a disaggregated base station. The disaggregated base station includes the CU 1706 and each of the DUs 1708 and 1720 controlled by the CU 1706. The CU/DU functional split in disaggregated base stations can facilitate the realization of time-critical services, such as scheduling, retransmission, segmentation, and other similar services in the DU 1708/1720, while centralizing the less time-critical services in the CU 1706. In addition, the CU/DU separation enables termination of external interfaces in the CU 1706 instead of each DU, and further supports centralized termination of the PCDP to allow for dual connectivity and handover between the different DUs of the disaggregated base station. It should be understood that disaggregated base stations may be implemented within networks other than IAB networks, and the present disclosure is not limited to any particular type of network.

The following provides an overview of examples of the present disclosure.

EXAMPLE 1

A method for wireless communication at a user equipment (UE) in a wireless communication network, the method comprising: receiving a sounding reference signal (SRS) configuration for an SRS resource set, wherein the SRS resource set comprises a plurality of SRS resources associated with multiple transmission and reception points (TRPs); and transmitting a plurality of SRSs to the multiple TRPs in accordance with the SRS configuration.

EXAMPLE 2

The method of example 1, wherein each of the multiple TRPs comprise a same physical cell identifier (PCI).

EXAMPLE 3

The method of example 1, wherein at least two TRPs of each of the multiple TRPs comprise a different respective PCI.

EXAMPLE 4

The method of any of examples 1 through 3, wherein the multiple TRPs belong to a same timing advance group (TAG).

EXAMPLE 5

The method of any of examples 1 through 4, wherein the plurality of SRS resources associated with the multiple TRPs are located within consecutive symbols of a slot.

EXAMPLE 6

The method of any of examples 1 through 3 wherein at least two TRPs of the multiple TRPs belong to different respective TAGs.

EXAMPLE 7

The method of example 6, wherein the plurality of SRS resources associated with the multiple TRPs comprise a first set of SRS resources associated with a first TAG and a second set of SRS resources associated with a second TAG, and further comprising: providing a gap length of at least one symbol between the first set of SRS resources and the second set of SRS resources.

EXAMPLE 8

The method of example 7, further comprising: configuring the gap length based on a timing difference between a first timing advance command associated with the first TAG and a second timing advance command associated with the second TAG.

EXAMPLE 9

The method of example 7, further comprising: receiving the gap length from a TRP of the multiple TRPs.

EXAMPLE 10

The method of any of examples 1 through 9, wherein the SRS resource set comprises a periodic SRS resource set, a semi-persistent SRS resource set, or an aperiodic SRS resource set.

EXAMPLE 11

The method of any of examples 1 through 10, wherein the plurality of SRS resources associated with the multiple TRPs comprise a first set of SRS resources associated with a first TRP of the multiple TRPs and a second set of SRS resources associated with a second TRP of the multiple TRPs, the first set of SRS resources comprising a first quasi co-location (QCL) association and the second set of SRS resources comprising a second QCL association different than the first QCL association, and further comprising: providing a gap length of one or more symbols between the first set of SRS resources and the second set of SRS resources.

EXAMPLE 12

The method of example 11, further comprising: determining the gap length based on a capability of the UE.

EXAMPLE 13

The method of example 11, further comprising: receiving an indication of the gap length from a TRP of the multiple TRPs.

EXAMPLE 14

The method of any of examples 1 through 13, wherein the SRS configuration comprises a respective set of SRS resource set parameters for each of the multiple TRPs.

EXAMPLE 15

The method of any of examples 1 through 13, wherein the SRS configuration comprises a common set of SRS resource set parameters for the multiple TRPs.

EXAMPLE 16

The method of any of examples 1 through 15, further comprising: receiving multiple transmit power control commands, each associated with a TRP of the multiple TRPs, and wherein transmitting the plurality of SRSs to the multiple TRPs further comprises: transmitting the plurality of SRSs to the multiple TRPs utilizing a respective transmit power for each of the multiple TRPs based on the multiple transmit power control commands.

EXAMPLE 17

The method of any of examples 1 through 15, further comprising: receiving a transmit power control command applicable to each of the TRPs, and wherein transmitting the plurality of SRSs to the multiple TRPs further comprises: transmitting the plurality of SRSs to the multiple TRPs utilizing a same transmit power for each of the plurality of SRSs based on the transmit power control command.

EXAMPLE 18

The method of example 17, wherein the plurality of SRS resources associated with the multiple TRPs comprise a first set of SRS resources associated with a first TRP of the multiple TRPs and a second set of SRS resources associated with a second TRP of the multiple TRPs, and wherein the receiving the transmit power control command applicable to each of the TRPs further comprises: receiving the transmit power control command for the first set of SRS resources; and applying the transmit power control command to the second set of SRS resources.

EXAMPLE 19

The method of any of examples 1 through 18, wherein the SRS resource set comprises an aperiodic SRS resource set, and further comprising: receiving control information comprising a codepoint triggering the SRS configuration.

EXAMPLE 20

The method of any of examples 1 through 18, wherein the SRS resource set comprises an aperiodic SRS resource set, and the SRS configuration comprises a plurality of TRP SRS configurations, each associated with a respective TRP of the multiple TRPs, and further comprising: receiving control information comprising a codepoint triggering the plurality of TRP SRS configurations.

EXAMPLE 21

A method for wireless communication at a radio access network (RAN) entity in a wireless communication network, the method comprising: configuring a sounding reference signal (SRS) configuration for an SRS resource set for a user equipment (UE), wherein the SRS resource set comprises a plurality of SRS resources associated with multiple transmission and reception points (TRPs); transmitting the SRS configuration for the SRS resource set to the UE; and receiving at least one SRS from the UE in accordance with the SRS configuration.

EXAMPLE 22

The method of example 21, wherein each of the multiple TRPs comprise a same physical cell identifier (PCI).

EXAMPLE 23

The method of example 21, wherein at least two TRPs of each of the multiple TRPs comprise a different respective PCI.

EXAMPLE 24

The method of any of examples 21 through 23, wherein the RAN entity comprises at least one TRP of the multiple TRPs.

EXAMPLE 25

The method of any of examples 21 through 24, wherein the multiple TRPs belong to a same timing advance group (TAG).

EXAMPLE 26

The method of any of examples 21 through 25, wherein the plurality of SRS resources associated with the multiple TRPs are located within consecutive symbols of a slot.

EXAMPLE 27

The method of any of examples 21 through 24, wherein at least two TRPs of the multiple TRPs belong to different respective TAGs.

EXAMPLE 28

The method of any of examples 21 through 24 or example 27, wherein the plurality of SRS resources associated with the multiple TRPs comprise a first set of SRS resources associated with a first TAG and a second set of SRS resources associated with a second TAG, and further comprising: determining a gap length of at least one symbol to be applied between the first set of SRS resources and the second set of SRS resources; and transmitting an indication of the gap length to the UE.

EXAMPLE 29

The method of any of examples 21 through 28, wherein the SRS resource set comprises a periodic SRS resource set, a semi-persistent SRS resource set, or an aperiodic SRS resource set.

EXAMPLE 30

The method of any of examples 21 through 29, wherein the plurality of SRS resources associated with the multiple TRPs comprise a first set of SRS resources associated with a first TRP of the multiple TRPs and a second set of SRS resources associated with a second TRP of the multiple TRPs, the first set of SRS resources comprising a first quasi co-location (QCL) association and the second set of SRS resources comprising a second QCL association different than the first QCL association, and further comprising: determining a gap length of at least one symbol to be applied between the first set of SRS resources and the second set of SRS resources; and transmitting an indication of the gap length to the UE.

EXAMPLE 31

The method of example 30, wherein the determining the gap further comprises: determining the gap length based on a capability of the UE.

EXAMPLE 32

The method of any of examples 21 through 31, wherein the SRS configuration comprises a respective set of SRS resource parameters for each of the multiple TRPs.

EXAMPLE 33

The method of any of examples 21 through 31, wherein the SRS configuration comprises a common set of SRS resource parameters for the multiple TRPs.

EXAMPLE 34

The method of any of examples 21 through 33, further comprising: transmitting at least one transmit power control command, each of the at least one transmit power control command associated with a TRP of the multiple TRPs.

EXAMPLE 35

The method of any of examples 21 through 33, further comprising: transmitting a transmit power control command applicable to each of the TRPs.

EXAMPLE 36

The method of any of examples 21 through 35, wherein the SRS resource set comprises an aperiodic SRS resource set, and further comprising: transmitting control information to the UE, the control information comprising a codepoint triggering the SRS configuration.

EXAMPLE 37

The method of any of examples 21 through 35, wherein the SRS resource set comprises an aperiodic SRS resource set, and the SRS configuration comprises a plurality of TRP SRS configurations, each associated with a respective TRP of the multiple TRPs, and further comprising: transmitting control information to the UE, the control information comprising a codepoint triggering the plurality of TRP SRS configurations.

EXAMPLE 38

An apparatus for wireless communication comprising a processor, a memory coupled to the processor, the processor and memory configured to perform a method of any one of examples 1 through 20.

EXAMPLE 39

An apparatus for wireless communication comprising a processor, a memory coupled to the processor, the processor and memory configured to perform a method of any one of examples 21 through 37.

EXAMPLE 40

An apparatus for wireless communication comprising at least one means for performing a method of any one of examples 1 through 20.

EXAMPLE 41

An apparatus for wireless communication comprising at least one means for performing a method of any one of examples 21 through 37.

EXAMPLE 42

A non-transitory computer-readable medium storing computer-executable code, comprising code for causing an apparatus to perform a method of any one of examples 1 through 20.

EXAMPLE 43

A non-transitory computer-readable medium storing computer-executable code, comprising code for causing an apparatus to perform a method of any one of examples 21 through 37.

EXAMPLE 44

A method for wireless communication at a radio access network (RAN) entity in a wireless communication network, the method comprising: transmitting a sounding reference signal (SRS) configuration for an SRS resource set for a user equipment (UE) to the UE, wherein the SRS resource set comprises a plurality of SRS resources associated with multiple transmission and reception points (TRPs); and receiving at least one SRS from the UE in accordance with the SRS configuration.

EXAMPLE 45

The method of example 44, wherein each of the multiple TRPs comprise a same physical cell identifier (PCI).

EXAMPLE 46

The method of example 45, wherein at least two TRPs of each of the multiple TRPs comprise a different respective PCI.

EXAMPLE 47

The method of any of examples 44 through 46, wherein the RAN entity comprises at least one TRP of the multiple TRPs.

EXAMPLE 48

The method of any of examples 44 through 47, wherein the multiple TRPs belong to a same timing advance group (TAG) and the plurality of SRS resources associated with the multiple TRPs are located within consecutive symbols of a slot.

EXAMPLE 49

The method of any of examples 44 through 47, wherein at least two TRPs of the multiple TRPs belong to different respective TAGs and the plurality of SRS resources associated with the multiple TRPs comprise a first set of SRS resources associated with a first TAG and a second set of SRS resources associated with a second TAG, and further comprising: determining a gap length of at least one symbol to be applied between the first set of SRS resources and the second set of SRS resources; and transmitting an indication of the gap length to the UE.

EXAMPLE 50

The method of any of examples 44 through 47, wherein the plurality of SRS resources associated with the multiple TRPs comprise a first set of SRS resources associated with a first TRP of the multiple TRPs and a second set of SRS resources associated with a second TRP of the multiple TRPs, the first set of SRS resources comprising a first quasi co-location (QCL) association and the second set of SRS resources comprising a second QCL association different than the first QCL association, and further comprising: determining a gap length of at least one symbol to be applied between the first set of SRS resources and the second set of SRS resources; and transmitting an indication of the gap length to the UE.

EXAMPLE 51

The method of example 50, wherein the determining the gap length further comprises: determining the gap length based on a capability of the UE.

EXAMPLE 52

The method of any of examples 44 through 51, further comprising: transmitting at least one transmit power control command to the UE, each of the at least one transmit power control command associated with a respective TRP of the multiple TRPs.

EXAMPLE 53

The method of any of examples 44 through 51, further comprising: transmitting a transmit power control command applicable to each of the TRPs to the UE.

EXAMPLE 54

An apparatus for wireless communication comprising a processor, a memory coupled to the processor, the processor and memory configured to perform a method of any one of examples 44 through 53.

EXAMPLE 55

An apparatus for wireless communication comprising at least one means for performing a method of any one of examples 44 through 53.

EXAMPLE 56

A non-transitory computer-readable medium storing computer-executable code, comprising code for causing an apparatus to perform a method of any one of examples 44 through 53.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-17 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1, 3, 4, 7-12, 16, and/or 17 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b, and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. An apparatus configured for wireless communication at a user equipment (UE), comprising:
   one or more processors; and
   one or more memories coupled to the one or more processors, wherein the one or more processors are configured to cause the UE to:
      receive a sounding reference signal (SRS) configuration for an SRS resource set, wherein the SRS resource set comprises a plurality of SRS resources associated with multiple transmission and reception points (TRPs), wherein the SRS configuration comprises a gap length of at least one symbol between a first set of SRS resources of the plurality of SRS resources and a second set of SRS resources of the plurality of SRS resources, wherein at least two TRPs of the multiple TRPs belong to different respective timing advance groups (TAGs), the first set of SRS resources is associated with a first TAG, and the second set of SRS resources associated with a second TAG;
      provide the gap length between the first set of SRS resources of the plurality of SRS resources and the second set of SRS resources of the plurality of SRS resources; and
      transmit a plurality of SRSs to the multiple TRPs in accordance with the SRS configuration and the gap length.

2. The apparatus of claim 1, wherein each of the multiple TRPs comprise a same physical cell identifier (PCI).

3. The apparatus of claim 1, wherein two or more TRPs of each of the multiple TRPs comprise a different respective PCI.

4. The apparatus of claim 1, wherein the one or more processors are further configured to cause the UE to:
   receive the SRS configuration from a TRP of the multiple TRPs.

5. The apparatus of claim 1, wherein the first set of SRS resources is associated with a first TRP of the multiple TRPs and the second set of SRS resources is associated with a second TRP of the multiple TRPs, the first set of SRS resources comprising a first quasi co-location (QCL) association and the second set of SRS resources comprising a second QCL association different than the first QCL association.

6. The apparatus of claim 5, wherein the one or more processors are further configured to cause the UE to:
   receive the SRS configuration from a TRP of the multiple TRPs.

7. The apparatus of claim 1, wherein the SRS configuration comprises at least one of a respective set of SRS resource set parameters for each of the multiple TRPs or a common set of SRS resource set parameters for the multiple TRPs.

8. The apparatus of claim 1, further comprising:
   one or more transceivers coupled to the one or more processors and the one or more memories, wherein the one or more processors are further configured to cause the UE to:
      receive multiple transmit power control commands, each associated with a TRP of the multiple TRPs, via the one or more transceivers; and
      transmit the plurality of SRSs to the multiple TRPs with a respective transmit power for each of the multiple TRPs based on the multiple transmit power control commands via the one or more transceivers.

9. The apparatus of claim 1, wherein the one or more processors are further configured to cause the UE to:
   receive a transmit power control command applicable to each of the TRPs; and
   transmit the plurality of SRSs to the multiple TRPs with a same transmit power for each of the plurality of SRSs based on the transmit power control command.

10. The UE of claim 9, wherein the plurality of SRS resources associated with the multiple TRPs comprise the first set of SRS resources associated with a first TRP of the multiple TRPs and the second set of SRS resources associated with a second TRP of the multiple TRPs, and wherein the one or more processors are further configured to cause the UE to:
    receive the transmit power control command for the first set of SRS resources; and
    apply the transmit power control command to the second set of SRS resources.

11. The UE of claim 1, wherein the SRS resource set comprises an aperiodic SRS resource set, and the SRS configuration comprises a plurality of TRP SRS configurations, each associated with a respective TRP of the multiple TRPs, and wherein the one or more processors are further configured to cause the UE to:
    receive control information comprising a codepoint triggering the plurality of TRP SRS configurations.

12. A method for wireless communication at a user equipment (UE), the method comprising:
    receiving a sounding reference signal (SRS) configuration for an SRS resource set, wherein the SRS resource set comprises a plurality of SRS resources associated with multiple transmission and reception points (TRPs), wherein the SRS configuration comprises a gap length of at least one symbol between a first set of SRS resources of the plurality of SRS resources and a second set of SRS resources of the plurality of SRS resources, wherein at least two TRPs of the multiple TRPs belong to different respective timing advance groups (TAGs), the first set of SRS resources is associated with a first TAG, and the second set of SRS resources associated with a second TAG;

providing the gap length between the first set of SRS resources of the plurality of SRS resources and the second set of SRS resources of the plurality of SRS resources; and transmitting a plurality of SRSs to the multiple TRPs in accordance with the SRS configuration.

13. The method of claim 12, wherein each of the multiple TRPs comprise a same physical cell identifier (PCI) or two or more TRPs of each of the multiple TRPs comprise a different respective PCI.

14. The method of claim 12, wherein two or more TRPs of each of the multiple TRPs comprise a different respective PCI.

15. The method of claim 12, wherein the first set of SRS resources is associated with a first TRP of the multiple TRPs and the second set of SRS resources is associated with a second TRP of the multiple TRPs, the first set of SRS resources comprising a first quasi co-location (QCL) association and the second set of SRS resources comprising a second QCL association different than the first QCL association.

16. The method of claim 12, wherein the SRS configuration comprises at least one of a respective set of SRS resource set parameters for each of the multiple TRPs or a common set of SRS resource set parameters for the multiple TRPs.

17. The method of claim 12, further comprising:
receiving multiple transmit power control commands, each associated with a TRP of the multiple TRPs; and
transmitting the plurality of SRSs to the multiple TRPs with a respective transmit power for each of the multiple TRPs based on the multiple transmit power control commands.

18. The method of claim 12, further comprising:
receiving a transmit power control command applicable to each of the TRPs; and
transmitting the plurality of SRSs to the multiple TRPs with a same transmit power for each of the plurality of SRSs based on the transmit power control command.

19. The method of claim 12, wherein the SRS resource set comprises an aperiodic SRS resource set, and the SRS configuration comprises a plurality of TRP SRS configurations, each associated with a respective TRP of the multiple TRPs, and further comprising:
receiving control information comprising a codepoint triggering the plurality of TRP SRS configurations.

20. An apparatus configured for wireless communication at a radio access network (RAN) entity, comprising:
one or more processors; and
one or more memories coupled to the one or more processors, wherein the one or more processors are configured to cause the RAN entity to:
provide a sounding reference signal (SRS) configuration for an SRS resource set for a user equipment (UE), wherein the SRS resource set comprises a plurality of SRS resources associated with multiple transmission and reception points (TRPs), wherein the SRS configuration comprises a gap length of at least one symbol to be applied between a first set of SRS resources of the plurality of SRS resources and a second set of SRS resources of the plurality of SRS resources, wherein at least two TRPs of the multiple TRPs belong to different respective timing advance groups (TAGs), the first set of SRS resources is associated with a first TAG, and the second set of SRS resources associated with a second TAG; and obtain at least one SRS in accordance with the SRS configuration and the gap length.

21. The apparatus of claim 20, wherein each of the multiple TRPs comprise a same physical cell identifier (PCI).

22. The apparatus of claim 20, wherein two or more TRPs of each of the multiple TRPs comprise a different respective PCI.

23. The apparatus of claim 20, wherein the RAN entity comprises at least one TRP of the multiple TRPs.

24. The apparatus of claim 20, wherein the first set of SRS resources is associated with a first TRP of the multiple TRPs and the second set of SRS resources is associated with a second TRP of the multiple TRPs, the first set of SRS resources comprising a first quasi co-location (QCL) association and the second set of SRS resources comprising a second QCL association different than the first QCL association.

25. The apparatus of claim 20, wherein the one or more processors are further configured to cause the RAN entity to:
determine the gap length based on a capability of the UE.

26. The apparatus of claim 20, wherein the SRS configuration comprises at least one of a respective set of SRS resource parameters for each of the multiple TRPs or a common set of SRS resource parameters for the multiple TRPs.

27. The apparatus of claim 20, wherein the one or more processors are further configured to cause the RAN entity to:
provide at least one transmit power control command for the UE, each of the at least one transmit power control command associated with a respective TRP of the multiple TRPs.

28. The apparatus of claim 20, wherein the one or more processors are further configured to cause the RAN entity to:
provide a transmit power control command applicable to each of the TRPs.

29. The apparatus of claim 20, wherein the SRS resource set comprises an aperiodic SRS resource set, and the SRS configuration comprises a plurality of TRP SRS configurations, each associated with a respective TRP of the multiple TRPs, and wherein the one or more processors are further configured to cause the RAN entity to:
provide control information, the control information comprising a codepoint triggering the plurality of TRP SRS configurations.

30. A method for wireless communication at a radio access network (RAN) entity in a wireless communication network, the method comprising:
providing a sounding reference signal (SRS) configuration for an SRS resource set for a user equipment (UE) to the UE, wherein the SRS resource set comprises a plurality of SRS resources associated with multiple transmission and reception points (TRPs), wherein the SRS configuration comprises a gap length of at least one symbol to be applied between a first set of SRS resources of the plurality of SRS resources and a second set of SRS resources of the plurality of SRS resources, wherein at least two TRPs of the multiple TRPs belong to different respective timing advance groups (TAGs), the first set of SRS resources is associated with a first TAG, and the second set of SRS resources associated with a second TAG; and
obtaining at least one SRS from the UE in accordance with the SRS configuration.

31. The method of claim 30, wherein each of the multiple TRPs comprise a same physical cell identifier (PCI) or two or more TRPs of each of the multiple TRPs comprise a different respective PCI.

32. A non-transitory computer-readable medium having stored therein instructions executable by one or more processors of a user equipment (UE) to:
receive a sounding reference signal (SRS) configuration for an SRS resource set, wherein the SRS resource set comprises a plurality of SRS resources associated with multiple transmission and reception points (TRPs), wherein the SRS configuration comprises a gap length of at least one symbol between a first set of SRS resources of the plurality of SRS resources and a second set of SRS resources of the plurality of SRS resources, wherein at least two TRPs of the multiple TRPs belong to different respective timing advance groups (TAGs), the first set of SRS resources is associated with a first TAG, and the second set of SRS resources associated with a second TAG;
provide the gap length between the first set of SRS resources of the plurality of SRS resources and the second set of SRS resources of the plurality of SRS resources; and
transmit a plurality of SRSs to the multiple TRPs in accordance with the SRS configuration and the gap length.

33. The non-transitory computer-readable medium of claim 32, wherein each of the multiple TRPs comprise a same physical cell identifier (PCI) or two or more TRPs of each of the multiple TRPs comprise a different respective PCI.

34. A non-transitory computer-readable medium having stored therein instructions executable by one or more processors of a radio access network (RAN) entity to:
provide a sounding reference signal (SRS) configuration for an SRS resource set for a user equipment (UE), wherein the SRS resource set comprises a plurality of SRS resources associated with multiple transmission and reception points (TRPs), wherein the SRS configuration comprises a gap length of at least one symbol to be applied between a first set of SRS resources of the plurality of SRS resources and a second set of SRS resources of the plurality of SRS resources, wherein at least two TRPs of the multiple TRPs belong to different respective timing advance groups (TAGs), the first set of SRS resources is associated with a first TAG, and the second set of SRS resources associated with a second TAG; and
obtain at least one SRS in accordance with the SRS configuration and the gap length.

35. The non-transitory computer-readable medium of claim 34, wherein each of the multiple TRPs comprise a same physical cell identifier (PCI) or two or more TRPs of each of the multiple TRPs comprise a different respective PCI.

* * * * *